US010177605B2

(12) United States Patent
Shimokawa

(10) Patent No.: US 10,177,605 B2
(45) Date of Patent: Jan. 8, 2019

(54) POWER RECEIVER AND POWER TRANSMITTING SYSTEM

(71) Applicant: FUJITSU LIMITED, Kawasaki-shi, Kanagawa (JP)

(72) Inventor: Satoshi Shimokawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 163 days.

(21) Appl. No.: 15/479,582

(22) Filed: Apr. 5, 2017

(65) Prior Publication Data
US 2017/0207667 A1 Jul. 20, 2017

Related U.S. Application Data

(63) Continuation of application No. PCT/JP2014/079049, filed on Oct. 31, 2014.

(51) Int. Cl.
H02J 50/12 (2016.01)
H02J 50/80 (2016.01)
(Continued)

(52) U.S. Cl.
CPC ............. *H02J 50/12* (2016.02); *H02J 7/025* (2013.01); *H02J 50/40* (2016.02); *H02J 50/80* (2016.02);
(Continued)

(58) Field of Classification Search
CPC .. H02J 50/12; H02J 50/80; H02J 50/40; H02J 7/025; H04B 5/0031; H04B 5/0037
See application file for complete search history.

(56) References Cited

U.S. PATENT DOCUMENTS

2005/0288739 A1 12/2005 Hassler et al.
2011/0006612 A1 1/2011 Kozakai
(Continued)

FOREIGN PATENT DOCUMENTS

CA 2868101 A1 10/2013
EP 1609501 A1 12/2005
(Continued)

OTHER PUBLICATIONS

International Search Report for International Application No. PCT/JP2014/079049 dated Dec. 2, 2014.
(Continued)

Primary Examiner — Robert Deberadinis
(74) Attorney, Agent, or Firm — Kratz, Quintos & Hanson, LLP

(57) ABSTRACT

A power receiver includes: a first secondary-side resonant coil that receives electric power from a primary-side resonant coil through magnetic field resonance; a capacitor; a smoothing circuit; a pair of output terminals; a switch coupled in parallel to the capacitor or in series between a rectifier circuit and either a first terminal or a second terminal; and a drive controller that drives the switch through a first PWM drive pattern determined by a first duty cycle and by a first frequency that is less than or equal to a frequency of the magnetic field resonance. The first duty cycle is set based on a first efficiency of power reception of the first secondary-side resonant coil, a first rated output of a first load, a second efficiency of power reception of a second secondary-side resonant coil of another power receiver, and a second rated output of a second load.

12 Claims, 20 Drawing Sheets

(51) Int. Cl.
    *H02J 50/40*    (2016.01)
    *H02J 7/02*     (2016.01)
    *H04B 5/00*     (2006.01)
(52) U.S. Cl.
    CPC ......... *H04B 5/0031* (2013.01); *H04B 5/0037* (2013.01)

(56)  References Cited

U.S. PATENT DOCUMENTS

| | | |
|---|---|---|
| 2011/0260682 A1 | 10/2011 | Low |
| 2013/0154384 A1 | 6/2013 | Nakamura |
| 2014/0184147 A1 | 7/2014 | Uchida |
| 2014/0225452 A1 | 8/2014 | Kozaki |
| 2015/0008736 A1 | 1/2015 | Uchida et al. |

FOREIGN PATENT DOCUMENTS

| | | |
|---|---|---|
| JP | 2011-019291 A1 | 1/2011 |
| JP | 2012-105477 A1 | 5/2012 |
| JP | 2013-062895 A1 | 4/2013 |
| JP | 2013-126326 A1 | 6/2013 |
| JP | 2013-530662 A1 | 7/2013 |
| KR | 10-2006-0049664 A | 5/2006 |
| WO | 2013035873 A1 | 3/2013 |
| WO | 2013146929 A1 | 10/2013 |

OTHER PUBLICATIONS

Korean Office Action for corresponding Korean Patent Application No. 10-2017-7011080, dated Apr. 9, 2018 (10 Sheets).
Extended European Search Report for counterpart EPC Patent Application No. 14905164.1 dated Sep. 25, 2017 (10 Sheets).

FIG.11A

| $M_{TB}$ \ $M_{TA}$ | $M_{TA1}$ | $M_{TA2}$ | $M_{TA3}$ | ... |
|---|---|---|---|---|
| $M_{TB1}$ | duty1A | duty2A | duty3A | |
| $M_{TB2}$ | duty11A | duty12A | duty13A | |
| ⋮ | | | | |

FIG.11B

| $M_{TB}$ \ $M_{TA}$ | $M_{TA1}$ | $M_{TA2}$ | $M_{TA3}$ | ... |
|---|---|---|---|---|
| $M_{TB1}$ | duty1B | duty2B | duty3B | |
| $M_{TB2}$ | duty11B | duty12B | duty13B | |
| ⋮ | | | | |

FIG.12A

| $M_{TA1}$ | $E_{A1}$ |
|---|---|
| $M_{TA2}$ | $E_{A2}$ |
| ⋮ | ⋮ |

FIG.12B

| $M_{TB1}$ | $E_{B1}$ |
|---|---|
| $M_{TB2}$ | $E_{B2}$ |
| ⋮ | ⋮ |

FIG.20

| COMBINATION OF Y1 TO YN | | | | COMBINATION OF D1 TO DN | | | |
|---|---|---|---|---|---|---|---|
| Ya1 | Ya2 | ... | YaN | Da1 | Da2 | ... | DaN |
| Yb1 | Yb2 | ... | YbN | Db1 | Db2 | ... | DbN |
| | | ... | | | | ... | |

POWER RECEIVER AND POWER TRANSMITTING SYSTEM

CROSS-REFERENCE TO RELATED APPLICATION

This application is a continuation application of International Application PCT/JP2014/079049 filed on Oct. 31, 2014 and designated the U.S., the entire contents of which are incorporated herein by reference.

FIELD

The embodiments discussed herein relate to a power receiver and a power transmitting system.

BACKGROUND

Conventionally, there exists a contactless power receiving apparatus including: a resonance element adapted to receive supply of alternating-current power in a contactless fashion by resonance from a resonance element of a power supplying source; an excitation element adapted to receive supply of the alternating-current power by electromagnetic induction from the resonance element; a rectification circuit adapted to generate direct-current power from the alternating-current power from the excitation element and output the direct-current power; and a changeover circuit adapted to change over the alternating-current power to the rectification circuit between a supply state and a non-supply state (see Patent Document 1, for example).

However, for the conventional contactless power receiving apparatus (power receiver), an efficiency of electric power reception when the resonance element receives electric power transmitted to the power receiver is not considered. Because the efficiency of electric power reception is changed depending on a position, orientation, or the like of the power receiver with respect to a power transmitter, when electric power is transmitted without considering the efficiency of electric power reception especially in a case where a plurality of power receivers are present, it may become impossible to supply the electric power to the plurality of power receivers in a balanced manner.

RELATED-ART DOCUMENTS

Patent Documents

[Patent Document 1] Japanese Laid-open Patent Publication No. 2011-019291

SUMMARY

According to an aspect of the embodiments, a power receiver includes a first secondary-side resonant coil, including a resonant coil part, a first terminal and a second terminal, that receives electric power from a primary-side resonant coil through magnetic field resonance generated between the primary-side resonant coil and the first secondary-side resonant coil, the first terminal and the second terminal being respectively provided on both ends of the resonant coil part; a capacitor inserted in series with the resonant coil part of the first secondary-side resonant coil; a rectifier circuit, coupled to the first terminal and the second terminal, that rectifies alternating-current power input from the first secondary-side resonant coil; a smoothing circuit coupled to an output side of the rectifier circuit; a pair of output terminals coupled to an output side of the smoothing circuit; a switch coupled in parallel to the capacitor or coupled in series between the rectifier circuit and one of the first terminal and the second terminal of the first secondary-side resonant coil; and a drive controller that drives the switch through a first PWM drive pattern determined by a first duty cycle and by a first frequency that is less than or equal to a frequency of the magnetic field resonance, the first duty cycle being set based on a first efficiency of electric power reception of the first secondary-side resonant coil, a first rated output of a first load coupled to the pair of output terminals, a second efficiency of electric power reception of a second secondary-side resonant coil of another power receiver that receives electric power from the primary-side resonant coil through magnetic field resonance generated between the primary-side resonant coil and the second secondary-side resonant coil, and a second rated output of a second load to which the electric power is supplied from the other power receiver.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIGS. 11A and 11B are diagrams illustrating table data that associates duty cycles with relationships between mutual inductances $M_{TA}$ and mutual inductances $M_{TB}$;

FIGS. 12A and 12B are diagrams illustrating table data that associate efficiencies of electric power reception with mutual inductances $M_{TA}$ and $M_{TB}$;

FIG. 20 is a diagram illustrating tabular data used in the third embodiment.

DESCRIPTION OF EMBODIMENT

Hereinafter, embodiments, to which power receivers and a power transmitting system of the present invention are applied, will be described.

First Embodiment

Before describing a first embodiment to which power receivers and a power transmitting system of the present invention are applied, a technical premise of the power transmitting system and the power receivers according to the first embodiment is described with reference to FIGS. 1 to 3. An object is to provide a power receiver and a power transmitting system that can improve a supply balance of electric power.

Figure 1:
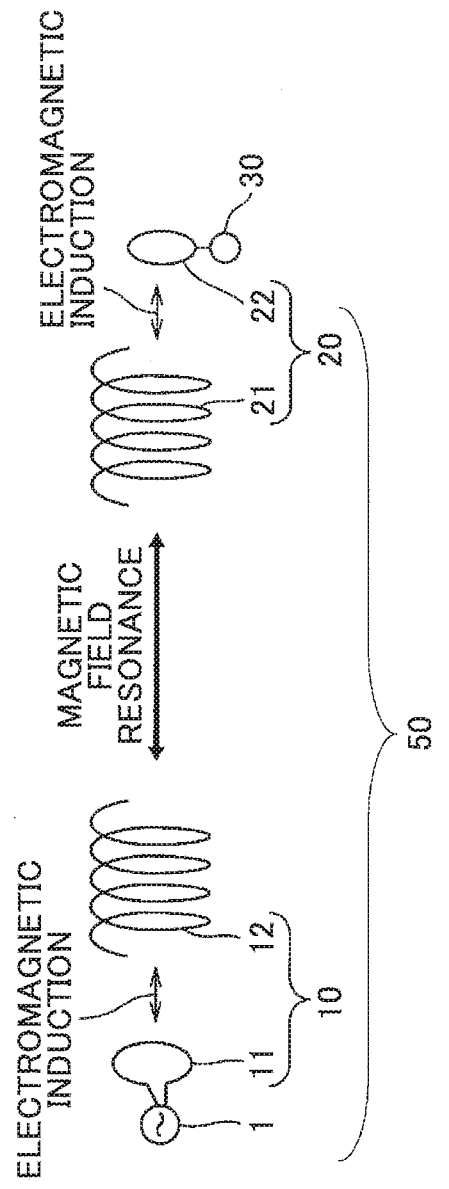
FIG. 1 is a diagram illustrating a power transmitting system 50.

FIG. 1 is a diagram illustrating a power transmitting system 50.

As illustrated in FIG. 1, the power transmitting system 50 includes an alternating-current (AC) power source 1, a primary-side (power transmitting side) power transmitter 10, and a secondary-side (power receiving side) power receiver 20. The power transmitting system 50 may include a plurality of power transmitters 10 and a plurality of power receivers 20.

The power transmitter 10 includes a primary-side coil 11 and a primary-side resonant coil 12. The power receiver 20 includes a secondary-side resonant coil 21 and a secondary-side coil 22. A load device 30 is coupled to the secondary-side coil 22.

As illustrated in FIG. 1, the power transmitter 10 and the power receiver 20 perform transmission of energy (electric power) from the power transmitter 10 to the power receiver 20 through magnetic-field resonance (magnetic-field sympathetic vibration) between the primary-side resonant coil (LC resonator) 12 and the power receiving resonant coil (LC resonator) 21. Here, the electric power can be transmitted from the primary-side resonant coil 12 to the secondary-side resonant coil 21 by not only the magnetic-field resonance but also by electric field resonance (electric field sympathetic vibration) or the like. In the following description, the magnetic-field resonance will be mainly described as an example.

In the first embodiment, for example, a case is described where a frequency of an AC voltage that the AC power source 1 outputs is 6.78 MHz and a resonance frequency of the primary-side resonant coil 12 and the secondary-side resonant coil 21 is 6.78 MHz.

Note that the power transmission from the primary-side coil 11 to the primary-side resonant coil 12 is performed by utilizing electromagnetic induction. Also, the power transmission from the secondary-side resonant coil 21 to the secondary-side coil 22 is performed by utilizing the electromagnetic induction.

Although FIG. 1 illustrates a configuration in which the power transmitting system 50 includes the secondary-side coil 22, the power transmitting system 50 is not required to include the secondary-side coil 22. In this case, the load device 30 may be directly coupled to the secondary-side resonant coil 21.

Figure 2:
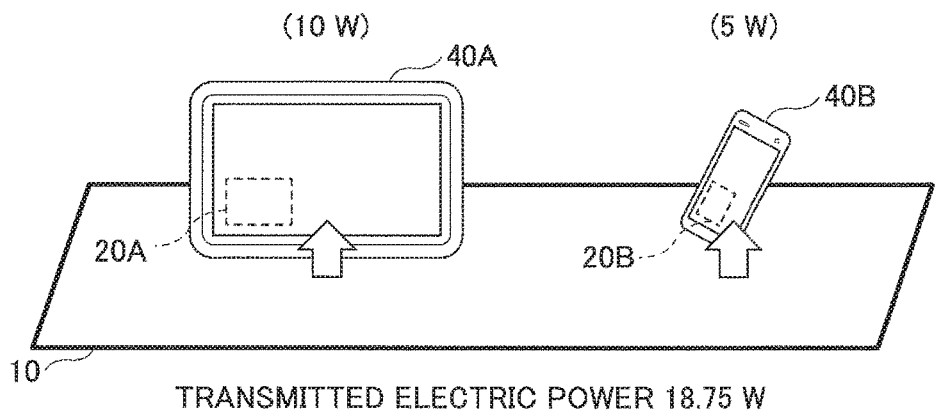
FIG. 2 is a diagram illustrating a state in which electric power is transmitted from a power transmitter 10 to electronic devices 40A and 40B through magnetic-field resonance.

FIG. 2 is a diagram illustrating a state where electric power is transmitted from the power transmitter 10 to electronic devices 40A and 40B through magnetic-field resonance.

The electronic devices 40A and 40B are a tablet computer and a smartphone, respectively, and include power receivers 20A and 20B, respectively. Each of the power receivers 20A and 20B has a configuration where the secondary-side coil 22 is removed from the power receiver 20 (see FIG. 1) illustrated in FIG. 1. That is, each of the power receivers 20A and 20B includes the secondary-side resonant coil 21. Note that although the simplified power transmitter 10 is illustrated in FIG. 2, the power transmitter 10 is coupled to the AC power source 1 (see FIG. 1).

In FIG. 2, each of the electronic devices 40A and 40B is arranged at an equal distance from the power transmitter 10. The power receivers 20A and 20B included in the respective electronic devices 40A and 40B simultaneously receive the electric power from the power transmitter 10 through the magnetic-field resonance in a non-contact state.

Here, for example, in a state illustrated in FIG. 2, an efficiency of electric power reception of the power receiver 20A included in the electronic device 40A is 40%, and an efficiency of electric power reception of the power receiver 20B included in the electronic device 40B is 40%.

The efficiency of electric power reception of the power receivers 20A and 20B is expressed as a rate of electric power received by the secondary-side coil 22 of each of the power receivers 20A and 20B, with respect to electric power transmitted from the primary-side coil 11 coupled to the AC power source 1. Note that in a case where the primary-side resonant coil 12 is directly coupled to the AC power source 1 and the power transmitter 10 does not include the primary-side coil 11, the received electric power may be calculated by using electric power transmitted from the primary-side resonant coil 12 instead of using the electric power transmitted from the primary-side coil 11. Further, in a case where the power receivers 20A and 20B do not include the secondary-side coil 22, received electric power may be calculated by using electric power received by the secondary-side resonant coil 21 instead of using the electric power received by the secondary-side coil 22.

The efficiency of electric power reception of the power receiver 20A and the efficiency of electric power reception of the power receiver 20B are determined depending on specifications of the coils of the power receivers 20A and 20B and of the power transmitter 10 and on distances/orientations between the power transmitter 10 and the respective power receivers 20A and 20B. In FIG. 2, because the power receivers 20A and 20B have the same configuration and are arranged at positions of equal distance/orientation from the power transmitter 10, the efficiency of electric power reception of the power receiver 20A and the efficiency of electric power reception of the power receiver 20B are equal to each other and, as an example, at 40%.

Further, a rated output of the electronic device 40A is taken as 10 W and a rated output of the electronic device 40B is taken as 5 W.

In such a case, electric power transmitted from the primary-side resonant coil 12 (see FIG. 1) of the power transmitter 10 is 18.75 W. Here, 18.75 W can be calculated by a formula of (10 W+5 W)/(40%+40%).

When electric power of 18.75 W is transmitted to the electronic devices 40A and 40B from the power transmitter 10, the power receivers 20A and 20B receive electric power of 15 W in total. Because the power receivers 20A and 20B equally receive the electric power, each of the power receivers 20A and 20B receives electric power of 7.5 W.

As a result, electric power to the electronic device 40A is insufficient by 2.5 W, and electric power to the electronic device 40B is excessive by 2.5 W.

That is, even when electric power of 18.75 W is transmitted from the power transmitter 10 to the electronic devices 40A and 40B, the electronic devices 40A and 40B cannot receive the electric power in a balanced manner. In other words, when the electronic devices 40A and 40B simultaneously receive electric power, the supply balance of electric power is not good.

Figure 3:
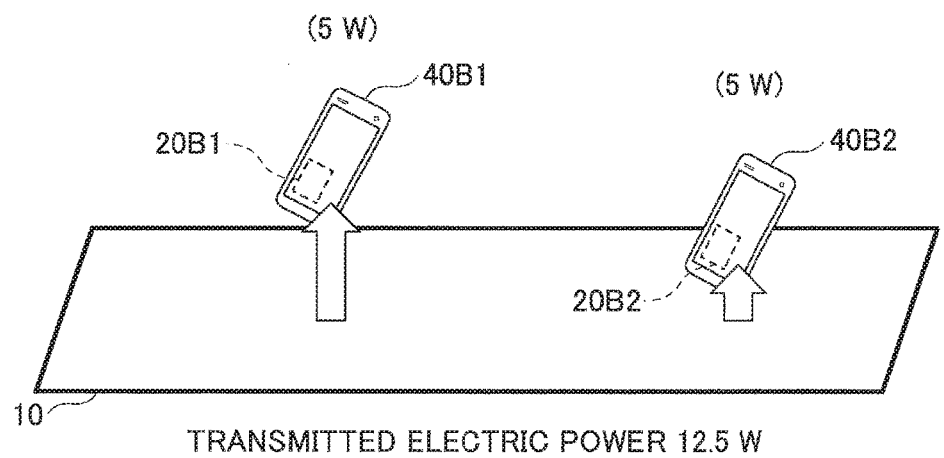
FIG. 3 is a diagram illustrating a state in which electric power is transmitted from the power transmitter 10 to electronic devices 40B1 and 40B2 through magnetic-field resonance.

FIG. 3 is a diagram illustrating a state where electric power is transmitted from the power transmitter 10 to electronic devices 40B1 and 40B2 through magnetic-field resonance.

The electronic devices 40B1 and 40B2 are the same type of smartphone and respectively include power receivers 20B1 and 20B2. Each of the power receivers 20B1 and 20B2 is equal to the power receiver 20B illustrated in FIG. 2. That is, each of the power receivers 20B1 and 20B2 includes the secondary-side resonant coil 21. Although a simplified power transmitter 10 is illustrated in FIG. 3, the power transmitter 10 is coupled to the AC power source 1 (see FIG. 1).

In FIG. 3, an angle (orientation) of the electronic device 40B1 with respect to the power transmitter 10 is equal to an angle (orientation) of the electronic device 40B2 with respect to the power transmitter 10. However, the electronic device 40B1 is arranged further away from the power transmitter 10 than the electronic device 40B2. The power receivers 20B1 and 20B2 included in the respective electronic devices 40B1 and 40B2 simultaneously receive electric power from the power transmitter 10 through the magnetic field resonance in a non-contact state.

For example, in the state illustrated in FIG. 3, an efficiency of electric power reception of the power receiver 20B1 included in the electronic device 40B1 is 35%, and an efficiency of electric power reception of the power receiver 20B2 included in the electronic device 40B2 is 45%.

Here, because the angle (orientation) of the electronic device 40B1 with respect to the power transmitter 10 and the angle (orientation) of the electronic device 40B2 with respect to the power transmitter 10 are equal to each other, the efficiency of electric power reception of the power receiver 20B1 and the efficiency of electric power reception of the power receiver 20B2 are determined depending on distances between the power transmitter 10 and the respective power receivers 20B1 and 20B2. Thus, in FIG. 3, the efficiency of electric power reception of the power receiver 20B1 is lower than the efficiency of electric power reception of the power receiver 20B2. Note that both the rated output of the electronic device 40B1 and the rated output of the electronic device 40B2 are 5 W.

In such a case, electric power transmitted from the primary-side resonant coil 12 (see FIG. 1) of the power transmitter 10 is 12.5 W. Here, 12.5 W can be calculated by a formula of (5 W+5 W)/(35%+45%).

When electric power of 12.5 W is transmitted to the electronic devices 40B1 and 40B2 from the power transmitter 10, the power receivers 20B1 and 20B2 receive electric power of 10 W in total. Further, because the efficiency of electric power reception of the power receiver 20B1 is 35%, and the efficiency of electric power reception of the power receiver 20B2 is 45% in FIG. 3, the power receiver 20B1 receives electric power of about 4.4 W and the power receiver 20B2 receives electric power of about 5.6 W.

As a result, electric power to the electronic device 40B1 is insufficient by about 0.6 W, and electric power to the electronic device 40B2 is excessive by about 0.6 W.

That is, even when electric power of 12.5 W is transmitted from the power transmitter 10 to the electronic devices 40B1 and 40B2, the electronic devices 40B1 and 40B2 cannot receive electric power in a balanced manner. In other words, when the electronic devices 40B1 and 40B2 simultaneously receive electric power, the supply balance of electric power is not good (has scope for improvement).

Here, in the above description of the supply balance of electric power, the angles (orientations) of the electronic devices 40B1 and 40B2 with respect to the power transmitter 10 are equal and the distances from the power transmitter 10 to the electronic devices 40B1 and 40B2 are different.

However, because the efficiencies of electric power reception are determined depending on the angles (orientations) and the distances between the power receivers 20B1 and 20B2 and the power transmitter 10, the efficiency of electric power reception of the power receiver 20B1 and the efficiency of electric power reception of the power receiver 20B2 become values different from the above described 35% and 45% when angles (orientations) of the electronic devices 40B1 and 40B2 are different from a positional relationship illustrated in FIG. 3.

The efficiency of electric power reception of the power receiver 20B1 and the efficiency of electric power reception of the power receiver 20B2 become different values from each other when angles (orientations) of the electronic devices 40B1 and 40B2, with respect to the power transmitter 10, are different even if the distances from the power transmitter 10 to the electronic devices 40B1 and 40B2 are equal to each other.

As described above, as illustrated in FIG. 2, when simultaneously transmitting electric power through magnetic field resonance from the power transmitter 10 to the electronic devices 40A and 40B of which rated outputs are different from each other, it is difficult for the electronic devices 40A and 40B to receive electric power in a balanced manner.

Also, as illustrated in FIG. 3, the efficiency of electric power reception of the power receiver 20B1 and the efficiency of electric power reception of the power receiver 20B2 are different from each other when angles (orientations) of the electronic devices 40B1 and 40B2, with respect to the power transmitter 10, are different even if the rated outputs of the electronic devices 40B1 and 40B2 are equal to each other. Therefore, it is difficult for the electronic devices 40A and 40B to receive electric power in a balanced manner.

Also, in the descriptions of the respective cases of FIG. 2 and FIG. 3, the electronic devices 40A and 40B and the electronic devices 40B1 and 40B2 receive the electric power at the same time. However, it is considered that a plurality of electronic devices such as the electronic devices 40A and 40B or the electronic devices 40B1 and 40B2 may separately receive electric power in a time-division manner.

However, in a case where a plurality of electronic devices separately receives electric power in a time-division manner, a problem occurs with the time taken for all the electronic devices to completely receive the electric power, because other power receivers cannot receive electric power during the time each power receiver is receiving electric power.

Next, a power transmitting system and a power receiver according to the first embodiment will be described with reference to FIG. 4 and FIG. 5.

Figure 4:
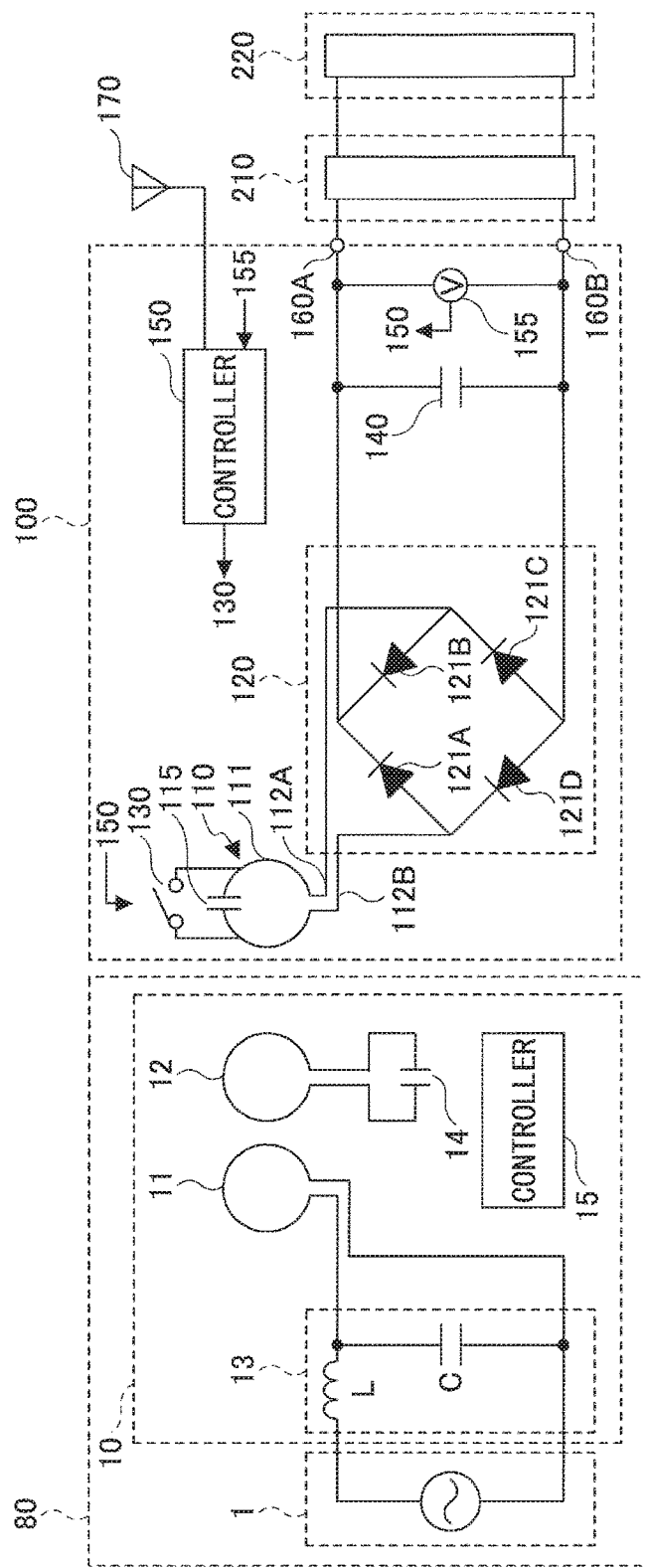
FIG. 4 is a diagram illustrating a power transmitting apparatus 80 and a power receiver 100 according to a first embodiment.

FIG. 4 is a diagram illustrating a power transmitting apparatus 80 and the power receiver 100 according to the first embodiment. The power transmitting apparatus 80 includes an alternating-current (AC) power source 1 and a power transmitter 10. Although the AC power source 1 and the power transmitter 10 are equivalent to those illustrated in FIG. 1, FIG. 4 illustrates a more specific configuration.

The power transmitting apparatus 80 includes the AC power source 1 and the power transmitter 10.

The power transmitter 10 includes a primary-side coil 11, a primary-side resonant coil 12, a matching circuit 13, a capacitor 14, and a controller 15.

The power receiver 100 includes a secondary-side resonant coil 110, a capacitor 115, a rectifier circuit 120, a switch 130, a smoothing capacitor 140, a controller 150, a voltmeter 155, output terminals 160A and 160B, and an antenna 170. A DC-DC converter 210 is coupled to the output terminals 160A and 160B, and a battery 220 is coupled to an output side of the DC-DC converter 210.

First, the power transmitter 10 will be described. As illustrated in FIG. 4, the primary-side coil 11 is a loop-shaped coil, and is coupled to the AC power source 1 via the matching circuit 13 between two ends of the primary-side coil 11. The primary-side coil 11 is disposed close to but not in contact with the primary-side resonant coil 12. The primary-side coil 11 is electromagnetically coupled to the primary-side resonant coil 12. The primary-side coil 11 is disposed such that the central axis of the primary-side coil 11 matches the central axis of the primary-side resonant coil 12. The central axis of the primary-side coil 11 and the central axis of the primary-side resonant coil 12 are made to match each other in order to inhibit leakage of magnetic flux and to inhibit unnecessary generation of magnetic fields around the primary-side coil 11 and the primary-side resonant coil 12, as well as improving the coupling strength between the primary-side coil 11 and the primary-side resonant coil 12.

The primary-side coil 11 generates magnetic fields by alternating-current (AC) power supplied from the AC power source 1 via the matching circuit 13, and transmits the electric power to the primary-side resonant coil 12 by electromagnetic induction (mutual induction).

As illustrated in FIG. 4, the primary-side resonant coil 12 is disposed close to but not in contact with the primary-side coil 11. The primary-side resonant coil 12 is electromagnetically coupled to the primary-side coil 11. Further, the primary-side resonant coil 12 has a predetermined resonance frequency and is designed to have a very high Q factor. The resonance frequency of the primary-side resonant coil 12 is set to be equal to the resonance frequency of the secondary-side resonant coil 110. The capacitor 14 for adjusting the resonance frequency is coupled in series between the two ends of the primary-side resonant coil 12.

The resonance frequency of the primary-side resonant coil 12 is set to be identical to the frequency of the AC power that the AC power source 1 outputs. The resonance frequency of the primary-side resonant coil 12 is determined depending on a capacitance of the capacitor 14 and an inductance of the primary-side resonant coil 12. Hence, the capacitance of the capacitor 14 and the inductance of the primary-side resonant coil 12 are set such that the resonance frequency of the primary-side resonant coil 12 is identical to the frequency of the AC power output from the AC power source 1.

The matching circuit 13 is inserted for matching impedance of the primary-side coil 11 and that of the AC power source 1, and includes an inductor L and a capacitor C.

The AC power source 1 is a power source that outputs AC power having the frequency necessary for the magnetic field resonance, and includes an amplifier that amplifies the output power. The AC power source 1 may, for example, output high frequency AC power from several hundreds of kHz to several tens of MHz.

The capacitor 14 is a variable capacitance capacitor inserted in series between the two ends of the primary-side resonant coil 12. The capacitor 14 is disposed for adjusting the resonance frequency of the primary-side resonant coil 12. The electrostatic capacitance of the capacitor 14 is set by the controller 15.

The controller 15 controls the output frequency and the output voltage of the AC power source 1 and controls the electrostatic capacitance of the capacitor 14.

The power transmitting apparatus 80 as described above transmits, to the primary-side resonant coil 12 through magnetic induction, the AC power supplied from the AC power source 1 to the primary-side coil 11, and transmits the electric power from the primary-side resonant coil 12 to the secondary-side resonant coil 110 of the power receiver 100 through magnetic field resonance.

Next, the secondary-side resonant coil 110 included in the power receiver 100 will be described. Here, in the description of the embodiment, the resonance frequency is 6.78 MHz, for example.

The secondary-side resonant coil 110 has a resonance frequency identical to that of the primary-side resonant coil 12, and is designed to have a very high Q factor. A pair of terminals of the secondary-side resonant coil 110 is coupled to the rectifier circuit 120. The secondary-side resonant coil 110 includes a resonant coil part 111, and terminals 112A and 112B. Here, although the resonant coil part 111 is substantially equivalent to the secondary-side resonant coil 110, a configuration, in which the terminals 112A and the 112B are provided on both ends of the resonant coil part 111, is treated as the secondary-side resonant coil 110.

In the resonant coil part 111, the capacitor 115 for adjusting the resonance frequency is inserted in series. Further, the switch 130 is coupled in parallel to the capacitor 115. Further, the terminals 112A and 112B are provided on both ends of the resonant coil part 111. The terminals 112A and 112B are coupled to the rectifier circuit 120. The terminals 112A and 112B are examples of a first terminal and a second terminal, respectively.

The secondary-side resonant coil 110 is coupled to the rectifier circuit 120 without through a secondary-side coil. In a state in which the switch 130 is off (open), the secondary-side resonant coil 110 outputs, to the rectifier circuit 120, the AC power transmitted from the primary-side resonant coil 12 of the power transmitter 10 through the magnetic field resonance.

The capacitor 115 is inserted in series with the resonant coil part 111 for adjusting the resonance frequency of the secondary-side resonant coil 110. The switch 130 is coupled in parallel to the capacitor 115.

The rectifier circuit 120 includes four diodes 121A to 121D. The diodes 121A to 121D are coupled in a bridge-like configuration, and rectify the full wave of the electric power input from the secondary-side resonant coil 110 to output the full-wave rectified power.

In the resonant coil part 111 of the secondary-side resonant coil 110, the switch 130 is coupled in parallel to the capacitor 115. When the switch 130 is off (open), the secondary-side resonant coil 110 is in a state in which a resonant current (alternating electric current) through magnetic field resonance may flow. When the switch 130 is ON (conductive), because the capacitor 115 is bypassed, the secondary-side resonant coil 110 is in a state in which resonance through magnetic field resonance is not satisfied.

The switch 130 may be a switch that can perform cutoff of an alternating current at high speed. For example, a TRIAC, a switch combining a plurality of Field Effect Transistor (FETs), or the like may be used as the switch 130. The switch 130 is driven through a Pulse Width Modulation (PWM). For example, a frequency of the PWM drive pattern used in the PWM driving is set to be a frequency about from one-several tenths to one-hundredth of a resonance frequency (6.78 MHz) through magnetic field resonance. Therefore, there is no problem using a TRIAC as the switch 130.

The switch 130 is driven by the controller 150 through PWM. A duty cycle of the PWM drive pattern of the switch 130 is determined based on an efficiency of electric power reception of the secondary-side resonant coil 110 of the power receiver 100 and on a rated output of a load circuit that receives electric power supplied from the power receiver 100. In FIG. 4, the load circuit is the battery 220.

Further, a frequency of the PWM drive pattern is set to be a frequency less than or equal to an alternating-current frequency at which the secondary-side resonant coil 110 receives electric power.

The smoothing capacitor 140 is coupled to the output side of the rectifier circuit 120, and smooths the electric power, on which the full-wave rectification is performed by the rectifier circuit 120, and outputs the smoothed power as direct-current power. The output terminals 160A and 160B are coupled to the output side of the smoothing capacitor 140. Because negative components of AC power are inverted into positive components, the electric power on which the full-wave rectification is performed by the rectifier circuit 120 can be treated as substantially AC power. However, stable DC power can be obtained by using the smoothing capacitor 140 even when ripple is included in the full wave rectified power.

Note that a line, which couples an upper side terminal of the smoothing capacitor 140 and the output terminal 160A, is a high voltage side line, and a line, which couples a lower side terminal of the smoothing capacitor 140 and the output terminal 160B, is a low voltage side line.

The controller 150 stores, in an internal memory, data that represents the rated output of the battery 220. Further, in response to a request from the controller 15 of the power transmitter 10, the controller 150 measures electric power (received electric power), which the power receiver 100 receives from the power transmitter 10, and transmits the data, which represents the received electric power, to the power transmitter 10 via the antenna 170. Further, upon receiving data that represents a duty cycle from the power transmitter 10, the controller 150 uses the received duty cycle to drive the switch 130. Note that the received electric power may be obtained by the controller 150 based on a voltage V measured by the voltmeter 155 and on an internal resistance value R of the battery 220. The received electric power P may be calculated by a formula of $P=V^2/R$.

The voltmeter 155 is coupled between the output terminals 160A and 160B. The voltmeter 155 is used to calculate the received electric power of the power receiver 100. Because in comparison with a case of measuring received electric power by measuring an electric current, losses are low by obtaining the received electric power based on the voltage V measured by the voltmeter 155 and on the internal resistance value R of the battery 220 as described above, thus it is a preferable measuring method. However, the received electric power of the power receiver 100 may also be calculated by measuring the electric current and the voltage. When measuring the electric current, a Hall Element, a magnetic resistance element, a detection coil, a resistor, or the like may be used for the measurement.

The DC-DC converter 210 is coupled to the output terminals 160A and 160B, and converts the voltage of the direct-current power that is output from the power receiver 100 into the rated voltage of the battery 220 to output the converted voltage. The DC-DC converter 210 lowers the output voltage, of the rectifier circuit 120 to the rated voltage of the battery 220 in a case where the output voltage of the rectifier circuit 120 is higher than the rated voltage of the battery 220. The DC-DC converter 210 raises the output voltage, of the rectifier circuit 120 to the rated voltage of the battery 220 in a case where the output voltage of the rectifier circuit 120 is lower than the rated voltage of the battery 220.

The battery 220 may be any rechargeable secondary battery that can be repeatedly charged. For example, a lithium ion battery may be used as the battery 220. For example, in a case where the power receiver 100 is included in an electronic device such as a tablet computer or a smartphone, the battery 220 is a main battery of the electronic device.

For example, the primary-side coil 11, the primary-side resonant coil 12, and the secondary-side resonant coil 110 may be made by winding copper wires. However, materials of the primary-side coil 11, the primary-side resonant coil 12, and the secondary-side resonant coil 110 may be metal other than copper (e.g., gold, aluminum, etc.). Further, materials of the primary-side coil 11, the primary-side resonant coil 12, and the secondary-side resonant coil 110 may be different from one another.

In such a configuration, the primary-side coil 11 and the primary-side resonant coil 12 correspond to a power transmitting side, and the secondary-side resonant coil 110 corresponds to a power receiving side.

According to a magnetic field resonance system, magnetic field resonance, generated between the primary-side resonant coil 12 and the secondary-side resonant coil 110, is utilized to transmit electric power from the power transmitting side to the power receiving side. Hence, it is possible to transmit the electric power over a longer distance than that of an electromagnetic induction system that utilizes electromagnetic induction to transmit electric power from the power transmitting side to the power receiving side.

The magnetic field resonance system is more flexible than the electromagnetic induction system with respect to the position gap or the distance between the resonant coils. The magnetic field resonance system thus has an advantage called "free-positioning".

Next, an efficiency of electric power reception of electric power that the power receiver 100 receives from the power transmitter 10 in a case of adjusting the duty cycle of the PWM drive pattern that drives the switch 130 will be described with reference to FIG. 5.

Figure 5:
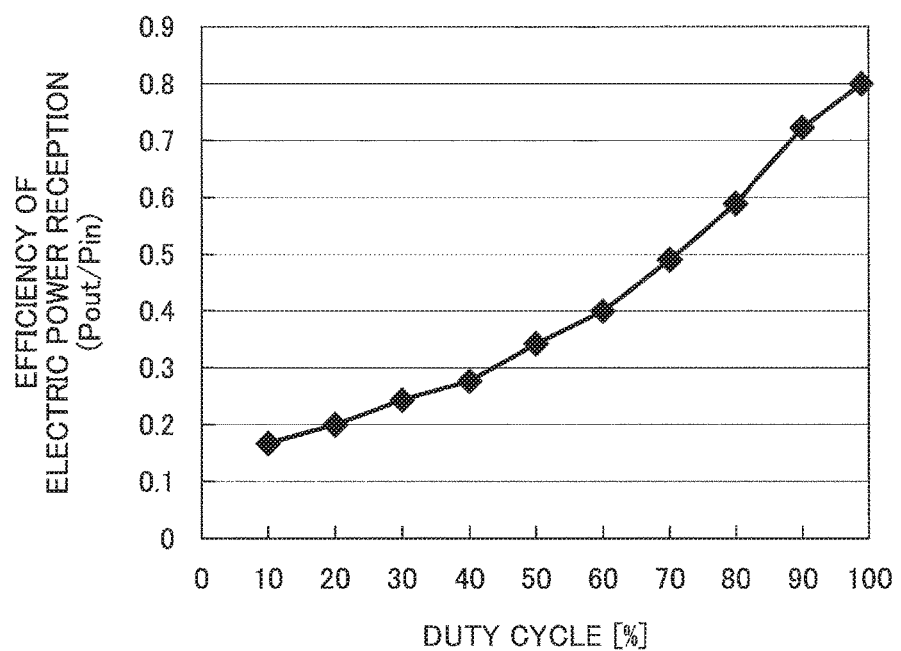
FIG. 5 is a diagram illustrating a simulation result that represents a property of an efficiency of electric power reception with respect to a duty cycle.

FIG. 5 is a diagram illustrating a simulation result that represents a property of the efficiency of electric power reception with respect to the duty cycle. The duty cycle of a horizontal axis is the duty cycle of the PWM drive pattern that drives the switch 130. The efficiency of electric power reception of a vertical axis is a ratio of electric power ($P_{out}$), which the power receiver 100 outputs, with respect to electric power ($P_{in}$), which the AC power source 1 (see FIG. 1) inputs to the power transmitter 10. The efficiency of electric power reception is equal to an efficiency of electric power transmission between the power transmitter 10 and the power receiver 100.

Note that a frequency of AC power that the power transmitter 10 transmits is set to be 6.78 MHz, and a frequency of the PWM drive pattern is set to be 300 KHz. A state, in which the duty cycle is 100%, is a state, in which the switch 130 is off (open) over the entire duration of one cycle of the PWM drive pattern and a resonant current flows through the secondary-side resonant coil 110 over the entire duration. On the other hand, a state, in which the duty cycle is 0%, is a state, in which a duration in which the switch 130 is off (open) is not present in one cycle of the PWM drive pattern and the switch 130 is on (conductive) over the entire duration. That is, the state, in which the duty cycle is 0%, is a state, in which a resonant current does not flow through the secondary-side resonant coil 110 over the entire duration of one cycle of the PWM drive pattern.

As illustrated in FIG. 5, when the duty cycle is decreased from 100%, the efficiency of electric power reception decreases. The efficiency of electric power reception is about 0.8 when the duty cycle is 100%, and the efficiency of electric power reception is about 0.17 when the duty cycle is 10%. In this way, when the duty cycle of the PWM drive pattern for driving the switch 130 is changed, the amount of electric power of a resonant current that flows through the secondary-side resonant coil 110 changes and therefore, the efficiency of electric power reception changes.

Figure 6:
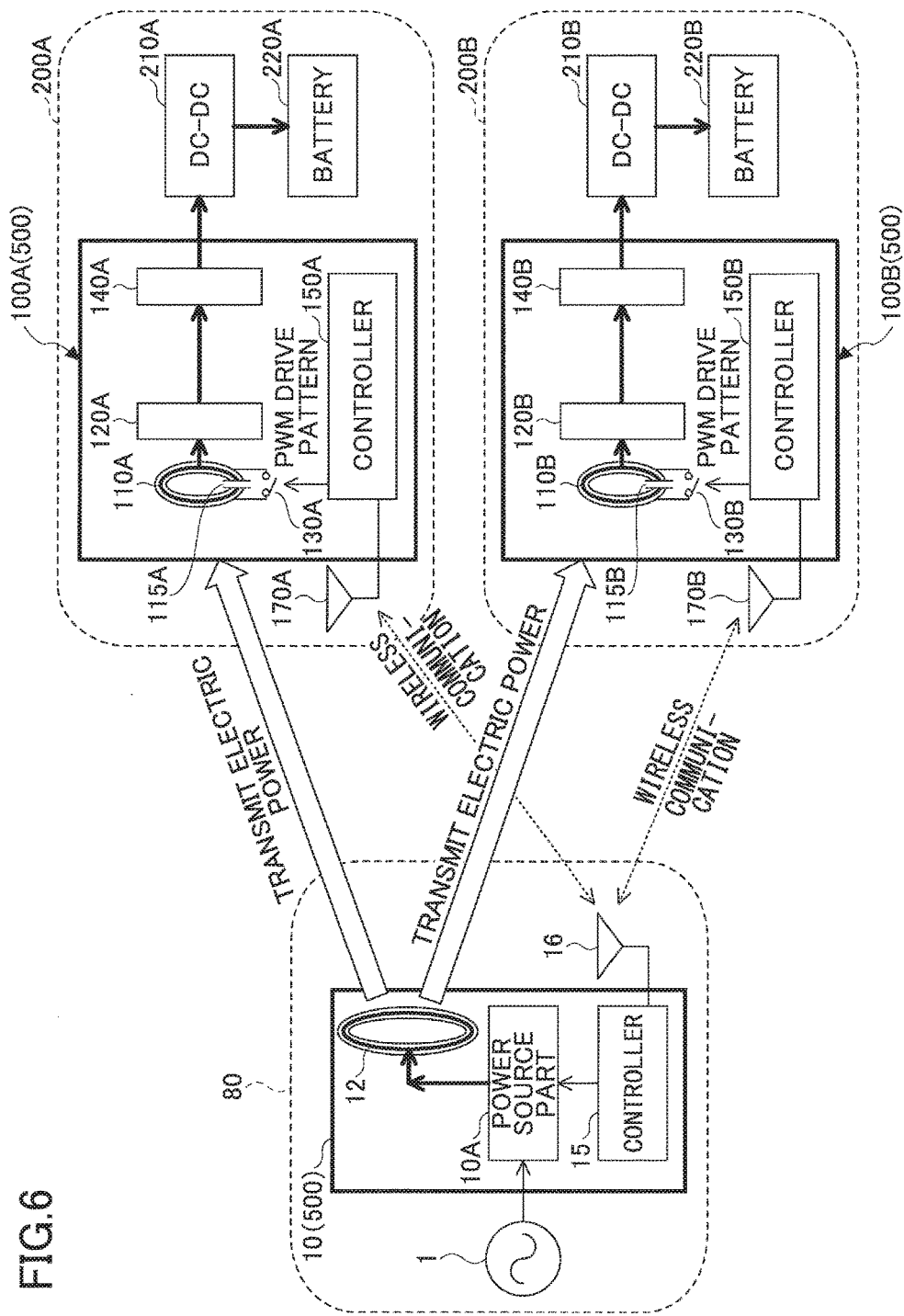
FIG. 6 is a diagram illustrating electronic devices 200A and 200B and the power transmitting apparatus 80 using a power transmitting system 500 according to the first embodiment.

FIG. 6 is a diagram illustrating electronic devices 200A and 200B and the power transmitting apparatus 80 using a power transmitting system 500 according to the first embodiment.

Although the power transmitting apparatus 80 in FIG. 6 is the same as the power transmitting apparatus 80 illustrated in FIG. 4, configuration elements other than the primary-side coil 11 and the controller 15 in FIG. 4 are expressed as a power source part 10A. The power source part 10A expresses the primary-side resonant coil 12, the matching circuit 13, and the capacitor 14 collectively. Note that the AC power source 1, the primary-side resonant coil 12, the matching circuit 13, and the capacitor 14 may be treated as the power source part collectively.

The power transmitting apparatus 80 further includes an antenna 16. For example, the antenna 16 may be any antenna that can perform wireless communication in a short distance such as Bluetooth (registered trade mark). The antenna 16 is provided in order to receive, from the power receivers 100A and 100B included in the electronic devices 200A and 200B, data representing the received electric power and the rated output. The received data is input to the controller 15. The controller 15 is an example of a controller and, is an example of a third communication part.

Each of the electronic devices 200A and 200B may be a terminal device such as a tablet computer or a smartphone, for example. The electronic devices 200A and 200B respectively include the power receivers 100A and 100B, DC-DC converters 210A and 210B, and the batteries 220A and 220B.

The power receivers 100A and 100B have a configuration equivalent to that of the power receiver 100 illustrated in FIG. 4. Each of the DC-DC converters 210A and 210B is equivalent to the DC-DC converter 210 illustrated in FIG. 4. Further, each of the batteries 220A and 220B is equivalent to the battery 220 illustrated in FIG. 4.

The power receiver 100A includes a secondary-side resonant coil 110A, a capacitor 115A, a rectifier circuit 120A, a switch 130A, a smoothing capacitor 140A, a controller 150A, and an antenna 170A. The secondary-side resonant coil 110A is an example of a first secondary-side resonant coil.

The secondary-side resonant coil 110A, the capacitor 115A, the rectifier circuit 120A, the switch 130A, the smoothing capacitor 140A, and the controller 150A respectively correspond to the secondary-side resonant coil 110, the capacitor 115, the rectifier circuit 120, the switch 130, the smoothing capacitor 140, and the controller 150 illustrated in FIG. 4. Note that, in FIG. 6, the secondary-side resonant coil 110A, the rectifier circuit 120A, and the smoothing capacitor 140A are illustrated in a simplified manner, and the voltmeter 155 and the output terminals 160A and 160B are omitted.

The power receiver 100B includes a secondary-side resonant coil 110B, a capacitor 115B, a rectifier circuit 120B, a switch 130B, a smoothing capacitor 140B, a controller 150B, and an antenna 170B. The power receiver 100B is an example of another power receiver as seen from the power receiver 100A. The secondary-side resonant coil 110B is an example of a second secondary-side resonant coil.

The secondary-side resonant coil 110B, the capacitor 115B, the rectifier circuit 120B, the switch 130B, the smoothing capacitor 140B, and the controller 150B respectively correspond to the secondary-side resonant coil 110, the capacitor 115, the rectifier circuit 120, the switch 130, the smoothing capacitor 140, and the controller 150 illustrated in FIG. 4. Note that, in FIG. 6, the secondary-side resonant coil 110B, the rectifier circuit 120B, the switch 130B, and the smoothing capacitor 140B are illustrated in a simplified manner, and the voltmeter 155 and the output terminals 160A and 160B are omitted.

For example, the antennas 170A and 170B may be any antenna that can perform wireless communication in a short distance such as Bluetooth (registered trade mark). The antennas 170A and 170B are provided in order to perform data communication with the antenna 16 of the power transmitter 10. The antennas 170A and 170B are coupled to the controllers 150A and 150B of the power receivers 100A and 100B, respectively. The controllers 150A and 150B are examples of a drive controller. The controllers 150A and 150B are examples of a first communication part and a second communication part, respectively.

The controller 150A of the power receiver 100A transmits, to the power transmitter 10 via the antenna 170A, data representing received electric power of the secondary-side resonant coil 110A and a rated output of the battery 220A. Similarly, the controller 150B of the power receiver 100B transmits, to the power transmitter 10 via the antenna 170B, data representing received electric power of the secondary-side resonant coil 110B and a rated output of the battery 220B.

In a state where the electronic devices 200A and 200B are arranged close to the power transmitting apparatus 80, the electronic devices 200A and 200B can respectively charge the batteries 220A and 220B without contacting the power transmitting apparatus 80. The batteries 220A and 220B can be charged at the same time.

The power transmitting system 500 is structured with the power transmitter 10 and the power receivers 100A and 100B of the configuration elements illustrated in FIG. 6. That is, the power transmitting apparatus 80 and the electronic devices 200A and 200B adopt the power transmitting system 500 that enables power transmission in a non-contact state through the magnetic field resonance.

Here, when the batteries 220A and 220B are charged at the same time, a state may occur in which the balance of electric power supplied to the electronic devices 200A and 200B is not good as described with reference to FIG. 2 and FIG. 3.

Hence, in order to improve the balance of supplied electric power, the power transmitter 10 sets, based on the efficiency of electric power reception of the secondary-side resonant coil 110A, the rated output of the battery 220A, the efficiency of electric power reception of the secondary-side resonant coil 110B, and the rated output of the battery 220B, duty cycles of PWM drive patterns that drive the switches 130A and 130B.

Figure 7:
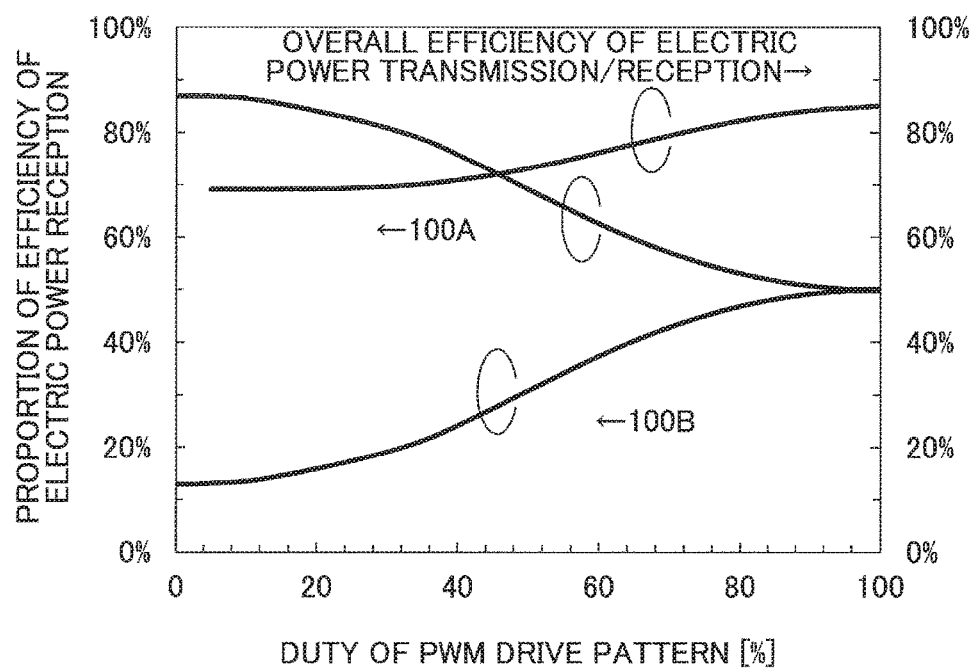
FIG. 7 is a diagram illustrating a relationship between duty cycles of PWM drive patterns and efficiencies of electric power reception of power receivers 100A and 100B.

FIG. 7 is a diagram illustrating a relationship between duty cycles of PWM drive patterns and amounts of received electric power by the power receivers 100A and 100B.

Here, a case, in which the duty cycle of the PWM drive pattern that drives the switch 130B of the power receiver 100B is decreased from 100% with respect to a state in which the duty cycle of the PWM drive pattern that drives the switch 130A of the power receiver 100A is fixed to 100%, will be described.

In FIG. 7, a horizontal axis indicates the duty cycle of the PWM drive pattern that drives the switch 130B of the power receiver 100B. Further, a left side vertical axis is indicating for proportions of the efficiencies of electric power reception of the power receivers 100A and 100B. Further, a right side vertical axis is indicating for, by percentage, a sum of the efficiencies of electric power reception of the power receivers 100A and 100B.

Here, the proportions of the efficiencies of electric power reception are proportions of the respective efficiencies of electric power reception of the power receivers 100A and 100B to the sum of the efficiencies of electric power reception, when the sum of the efficiencies of electric power reception of the power receivers 100A and 100B is taken as 100%. For example, in a case where both the efficiency of electric power reception of the power receiver 100A and the efficiency of electric power reception of the power receiver 100B are equal to each other and are 40% (sum of the efficiencies of electric power reception is 80%), both the proportion of the efficiency of electric power reception of the power receiver 100A and the proportion of the efficiency of electric power reception of the power receiver 100B are 50%.

The case, in which both the efficiency of electric power reception of the power receiver 100A and the efficiency of electric power reception of the power receiver 100B are equal to each other and are 40%, means a state in which both the efficiency of electric power reception of the power receiver 100A and the efficiency of electric power reception of the power receiver 100B are equal to each other and are 40% when the two power receivers 100A and 100B simultaneously receive electric power from the power transmitter 10. Note that each of the power receivers 100A and 100B has the efficiency of electric power reception of about 85% singly.

Here, for example, it is assumed that, in a state in which both the duty cycle of the PWM drive pattern that drives the switch 130A of the power receiver 100A and the duty cycle of the PWM drive pattern that drives the switch 130B of the power receiver 100B are 100%, both the proportion of the efficiency of electric power reception of the power receiver 100A and the proportion of the efficiency of electric power reception of the power receiver 100B are 50%.

When the duty cycle of the PWM drive pattern that drives the switch 130B of the power receiver 100B is decreased from 100%, in the state in which the duty cycle of the PWM drive pattern that drives the switch 130A of the power receiver 100A is fixed to 100%, the proportion of the efficiency of electric power reception of the power receiver 100B decreases as illustrated in FIG. 7. Further, in accordance with this, the proportion of the efficiency of electric power reception of the power receiver 100A increases.

In this way, when the duty cycle of the PWM drive pattern that drives the switch 130B of the power receiver 100B is decreased, an electric current that flows through the power receiver 100B decreases because the amount of received electric power of the power receiver 100B decreases. That is, the impedance of the power receiver 100B is changed depending on the change of the duty cycle.

In electric power transmission using magnetic field resonance, electric power, transmitted from the power transmitter 10 to the power receivers 100A and 100B through the magnetic field resonance, is distributed to the power receivers 100A and 100B. Hence, when the duty cycle of the PWM drive pattern that drives the switch 130B of the power receiver 100B is decreased from 100%, the amount of received electric power of the power receiver 100A increases by the decrease in the amount of received electric power of the power receiver 100B.

Hence, as illustrated in FIG. 7, the proportion of the efficiency of electric power reception of the power receiver 100B decreases. Further, in accordance with this, the proportion of the efficiency of electric power reception of the power receiver 100A increases.

When the duty cycle of the PWM drive pattern that drives the switch 130B of the power receiver 100B decreases to about 10%, the proportion of the efficiency of electric power reception of the power receiver 100B decreases to about 13% and the proportion of the efficiency of electric power reception of the power receiver 100A increases to about 87%.

Then, when the duty cycle of the PWM drive pattern that drives the switch 130B of the power receiver 100B is 100%, the sum of the efficiencies of electric power reception of the power receiver 100A and the power receiver 100B is about 85%. When the duty cycle of the PWM drive pattern that drives the switch 130B of the power receiver 100B is decreased to about 10%, the sum of the efficiencies of electric power reception of the power receiver 100A and the power receiver 100B becomes about 70%.

As described above, when the duty cycle of the PWM drive pattern for driving the switch 130B of the power receiver 100B is decreased from 100% in the state in which the duty cycle of the PWM drive pattern for driving the switch 130A of the power receiver 100A is fixed to 100%, the proportion of the efficiency of electric power reception of the power receiver 100B decreases and the proportion of the efficiency of electric power reception of the power receiver 100A increases. Then, the sum of the efficiency of electric power reception of the power receiver 100A and the efficiency of electric power reception of the power receiver 100B is a value around 80%, and does not largely change.

In electric power transmission using magnetic field resonance, the sum of the efficiencies of electric power reception of the power receivers 100A and 100B does not largely change even when the duty cycle is changed because electric power, transmitted from the power transmitter 10 to the power receivers 100A and 100B through the magnetic field resonance, is distributed to the power receivers 100A and 100B.

Similarly, when the duty cycle of the PWM drive pattern for driving the switch 130A of the power receiver 100A is decreased from 100% in a state in which the duty cycle of the PWM drive pattern for driving the switch 130B of the power receiver 100B is fixed to 100%, the proportion of the efficiency of electric power reception of the power receiver 100A decreases and the proportion of the efficiency of electric power reception of the power receiver 100B increases. Then, the sum of the efficiency of electric power reception of the power receiver 100A and the efficiency of electric power reception of the power receiver 100B is a value around 80%, and does not largely change.

Accordingly, it is possible to adjust the proportion of the efficiency of electric power reception of the power receiver 100A and the proportion of the efficiency of electric power reception of the power receiver 100B by adjusting the duty cycle of the PWM drive pattern that drives either the switch 130A of the power receiver 100A or the switch 130B of the power receiver 100B.

As described above, when the duty cycle of the PWM drive pattern that drives the switch 130A or the switch 130B is changed, the proportions of the efficiencies of electric power reception of the secondary-side resonant coils 110A and 110B of the power receivers 100A and the power receiver 100B are changed.

Hence, according to the first embodiment, the duty cycle of one PWM drive pattern of the PWM drive patterns for the switches 130A and 130B of the power receivers 100A and 100B is changed from a standard duty cycle. For example, the standard duty cycle may be 100%, and in this case, the one duty cycle is set to be an appropriate value less than 100%.

At this time, determination, as to whether to change the duty cycle of the PWM drive pattern of the switch 130A from the standard duty cycle or to change the duty cycle of the PWM drive pattern of the switch 130B from the standard duty cycle, is made as follows.

First, a first value, obtained by dividing the rated output of the battery 220A by the efficiency of electric power reception of the secondary-side resonant coil 110A and a second value, obtained by dividing the rated output of the battery 220B by the efficiency of electric power reception of the secondary-side resonant coil 110B, are calculated.

Then, the duty cycle of the PWM drive pattern corresponding to the power receiver (100A or 100B), having the smaller value of the first value and the second value, is set to be an appropriate value less than duty cycle 100%.

The value, obtained by dividing the rated output by the efficiency of electric power reception, represents an amount of electric power (required amount of transmission electric power) that the power transmitter 10 transmits to the power receiver 100A or 100B. The required amount of transmission electric power is an amount of electric power that is transmitted from the power transmitter 10 so that the power receiver (100A or 100B) receives the electric power without generating excessive electric power and insufficient electric power.

Accordingly, by reducing an amount of electric power supplied to the power receiver (100A or 100B) of which the required amount of transmission electric power is smaller, it is possible to increase an amount of electric power supplied to the power receiver (100A or 100B) of which the required amount of transmission electric power is larger. As a result, it is possible to improve the balance between the amount of electric power supplied to the power receiver 100A and the amount of electric power supplied to the power receiver 100B.

As can be seen from FIG. 7, when the duty cycle of one power receiver (100A or 100B) is decreased, the amount of received electric power of the one power receiver (100A or 100B) decreases. Further, the amount of received electric power of the other power receiver (100A or 100B) increases in a state in which the duty cycle of the other power receiver (100A or 100B) is fixed.

Hence, by decreasing the duty cycle of the PWM drive pattern corresponding to the power receiver (100A or 100B) of which the required amount of transmission electric power is smaller, it is possible to reduce the amount of electric power supplied to the power receiver (100A or 100B) of which the required amount of transmission electric power is smaller and to increase the amount of electric power supplied to the power receiver (100A or 100B) of which the required amount of transmission electric power is larger.

In this way, the balance of the amounts of electric power supplied to the power receivers 100A and 100B may be improved. Note that a method for setting a specific duty cycle will be described later below.

Further, at this time, the frequency of the PWM drive pattern is set to be a frequency less than or equal to a frequency of AC power that is transmitted through the magnetic field resonance. More preferably, the frequency of the PWM drive pattern is set to be a frequency less than the frequency of the AC power that is transmitted through the magnetic field resonance. For example, the frequency of the PWM drive pattern may be set to be a frequency less than the frequency of the AC power, which is transmitted through the magnetic field resonance, by about one or two orders of magnitude.

This is because if the frequency of the PWM drive pattern is higher than the frequency of the AC power that is transmitted through the magnetic field resonance, ON/OFF of the switch 130A or 130B is switched in the process of one cycle of full wave rectified electric power and there is a possibility that it becomes impossible to appropriately adjust the amount of electric power.

Accordingly, it is required to set the frequency of the PWM drive pattern to be a frequency less than or equal to the frequency of the AC power that is transmitted through the magnetic field resonance. Further, at that time, by setting the frequency of the PWM drive pattern to be a frequency less than the frequency of the AC power, which is transmitted through the magnetic field resonance, by about one or two orders of magnitude, it becomes possible to appropriately adjust the amount of electric power.

For example, in a case where the frequency of the AC power that is transmitted through the magnetic field resonance is 6.78 MHz, the frequency of the PWM drive pattern may be set to be several hundreds of KHz.

Here, a relationship between the duty cycle of the PWM drive pattern and the received electric power will be described with reference to FIG. 8.

Figure 8:
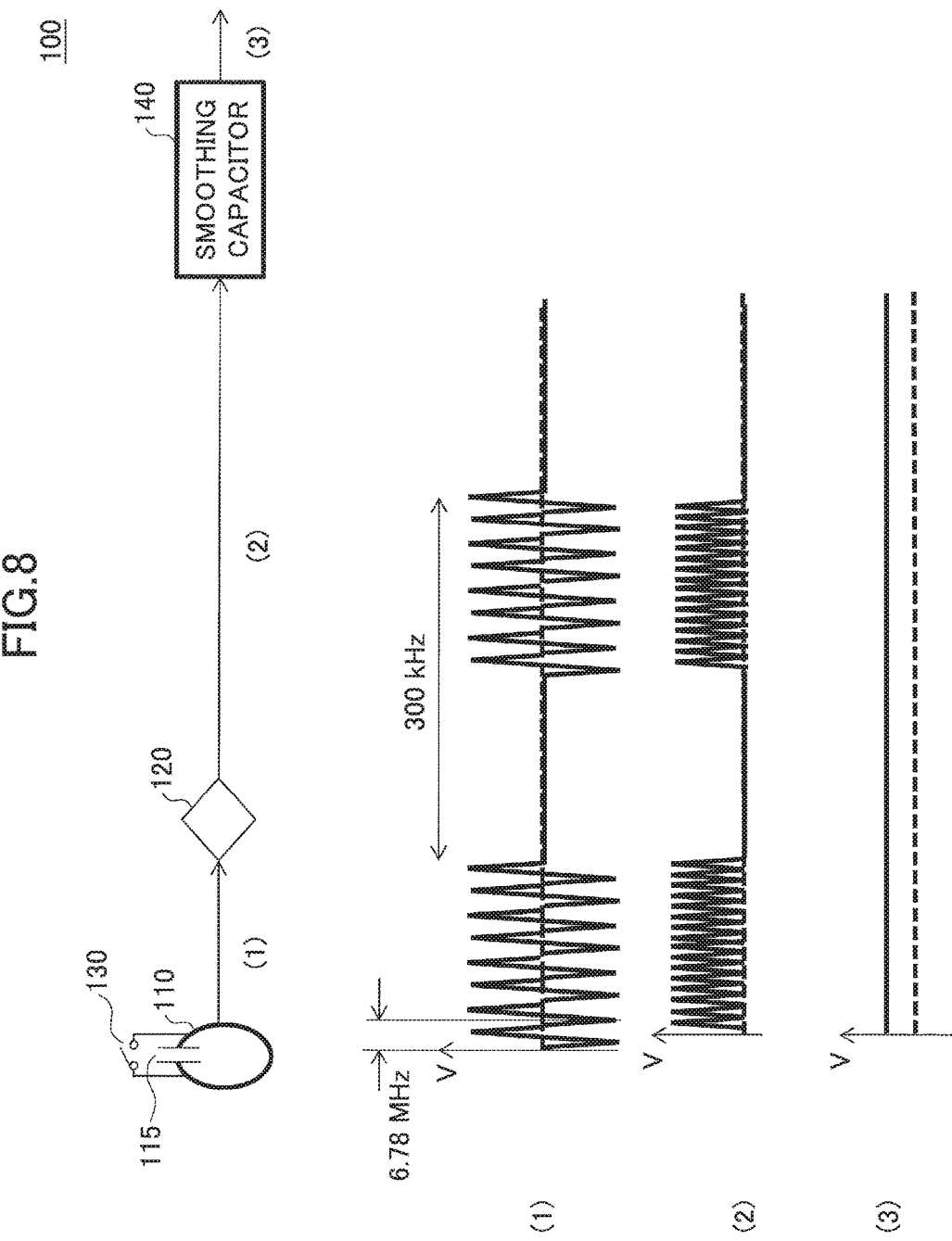
FIG. 8 is a diagram illustrating a relationship between a duty cycle of a PWM drive pattern and received electric power in the power receiver 100.

FIG. 8 is a diagram illustrating a relationship between the duty cycle of the PWM drive pattern and the received electric power in the power receiver 100.

In FIG. 8, the secondary-side resonant coil 110, the capacitor 115, the rectifier circuit 120, the switch 130, and the smoothing capacitor 140 of the power receiver 100 are illustrated in a simplified manner, and electric power waveforms (1), (2), and (3) are illustrated.

The electric power waveform (1) represents a waveform of electric power that is obtained between the secondary-side resonant coil 110 and the rectifier circuit 120. The electric power waveform (2) represents a waveform of electric power that is obtained between the rectifier circuit 120 and the smoothing capacitor 140. The electric power waveform (3) represents a waveform of electric power that is obtained in the output side of the smoothing capacitor 140.

Here, it is assumed that the frequency of AC voltage that the AC power source 1 outputs is 6.78 MHz and the resonance frequency of the primary-side resonant coil 12 and the secondary-side resonant coil 21 is 6.78 MHz. Further, it is assumed that the frequency of the PWM pulse of the PWM drive pattern is 300 kHz and the duty cycle is 50%.

As illustrated in FIG. 4, in a state in which the switch is off (open), the power receiver 100 has a circuit configuration, which forms a loop between the secondary-side resonant coil 110 and the battery 220, in practice.

Hence, a resonant current flows through the loop circuit while the switch 130 is turned off (open), but almost no electric current flows through the loop circuit while the switch 130 is turned on (conductive).

The electric power waveform (1) is a waveform of the AC power, which is supplied from the secondary-side resonant coil 110 to the rectifier circuit 120, intermittently flowing in accordance with ON/OFF of the switch 130.

The electric power waveform (2) is a waveform of the electric power, full wave rectified by the rectifier circuit 120, intermittently flowing in accordance with ON/OFF of the switch 130.

The electric power waveform (3) is DC power obtained by smoothing the electric power, full wave rectified by the rectifier circuit 120 and supplied to the smoothing capacitor 140. A voltage value of the electric power waveform (3) increases as the duty cycle increases, and decreases as the duty cycle decreases.

As described above, the voltage value of the DC power that is output from the smoothing capacitor 140 can be adjusted by adjusting the duty cycle of the drive pattern.

Next, a method of setting the duty cycle will be described.

When the duty cycle of the PWM drive pattern is changed in a case where electric power transmission of the magnetic field resonance type is performed, a degree of change of the efficiency of electric power reception does not change linearly with respect to a degree of change of the duty cycle.

For example, it is assumed that both the efficiency of electric power reception of the secondary-side resonant coil 110A and the efficiency of electric power reception of the secondary-side resonant coil 110B are 40% in a case where the duty cycles of the PWM drive patterns corresponding to the power receivers 100A and 100B are 100%.

In this case, when the duty cycle of the PWM drive pattern corresponding to the power receiver 100B is decreased to 71% in a state in which the duty cycle of the PWM drive pattern corresponding to the power receiver 100A is maintained at 100%, the efficiency of electric power reception of the secondary-side resonant coil 110A and the efficiency of electric power reception of the secondary-side resonant coil 110B become 50% and 25%, respectively.

As described above, because there is a non-linear relationship between the degree of change of the duty cycle of the PWM drive pattern and the degree of change of the efficiency of electric power reception, table data that associates duty cycles with efficiencies of electric power reception may be created and a duty cycle for obtaining a desired efficiency of electric power reception may be selected.

Next, a method, by which the power transmitter 10 obtains data that represents an efficiency of electric power reception and a rated output from each of the power receivers 100A and 100B, will be described with reference to FIG. 9.

Figure 9:
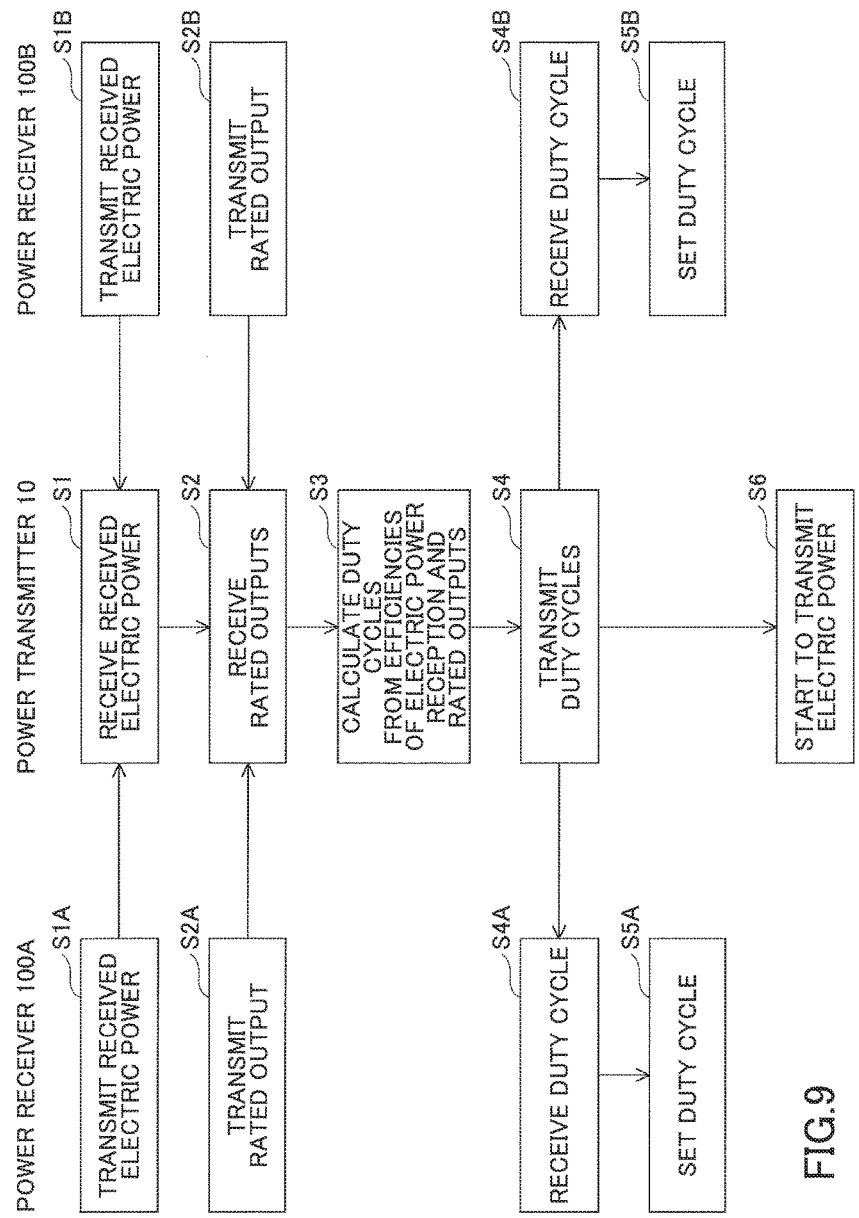
FIG. 9 is a task diagram illustrating processing that the power transmitter 10 and the power receivers 100A and 100B execute for setting the duty cycles.

FIG. 9 is a task diagram illustrating processing that the power transmitter 10 and the power receivers 100A and 100B execute for setting the duty cycles. This task is executed by the controllers 15, 150A and 150B (see FIG. 6).

First, the power receiver 100A transmits data, which represents received electric power, to the power transmitter 10 in step S1A. Similarly, the power receiver 100B transmits data, which represents received electric power, to the power transmitter 10 in step S1B. In this way, the power transmitter 10 receives the data representing the received electric power from each of the power receivers 100A and 100B.

For example, in response to a request from the power transmitter 10, the controllers 150A and 150B transmit the data, which represents the received electric power, via the antennas 170A and 170B. Further, the data representing the received electric power may include an identifier for identifying the power receivers 100A and 100B.

The data representing the received electric power may be obtained as follows. First, a signal for setting the duty cycle to be 0% is transmitted from the power transmitter 10 to the power receiver 100B through wireless communication and a signal for setting the duty cycle to be 100% is transmitted from the power transmitter 10 to the power receiver 100A through wireless communication.

Then, predetermined electric power is transmitted from the power transmitter 10 to the power receiver 100A through magnetic field resonance, and the power receiver 100A receives the electric power. At this time, when a signal, which represents the amount of electric power received by the power receiver 100A, is transmitted to the power transmitter 10, the power transmitter 10 can measure the efficiency of electric power reception of the power receiver 100A. Note that, at this time, the power receiver 100B is in an OFF state (non-operating state) because the duty cycle is 0%.

When measuring the efficiency of electric power reception of the power receiver 100B, a signal for setting the duty cycle to be 0% is transmitted from the power transmitter 10 to the power receiver 100A through wireless communication and a signal for setting the duty cycle to be 100% is transmitted from the power transmitter 10 to the power receiver 100B through wireless communication. When predetermined electric power is transmitted from the power transmitter 10 to the power receiver 100B through magnetic field resonance and a signal, which represents the amount of electric power received by the power receiver 100B, is transmitted to the power transmitter 10, the power transmitter 10 can measure the efficiency of electric power reception of the power receiver 100B.

Next, the power receiver 100A transmits data, which represents the rated output, to the power transmitter 10 in step S2A. Similarly, the power receiver 100B transmits data, which represents the rated output, to the power transmitter 10 in step S2B. In this way, the power transmitter 10 receives the data representing the rated output from each of the power receivers 100A and 100B in step S2.

For example, the data representing the rated output of the electronic device 200A may be previously stored in an internal memory of the controller 150A and the data representing the rated output of the electronic device 200B may be previously stored in an internal memory of the controller 150B. Then, the controllers 150A and 150B may transmit the stored data via the antennas 170A and 170B after transmitting the data representing the efficiency of electric power reception.

Next, the power transmitter 10 calculates, based on the data representing the efficiency of electric power reception of the power receiver 100A, the data representing the rated output of the power receiver 100A, the data representing the efficiency of electric power reception of the power receiver 100B, and on the data representing the rated output of the power receiver 100B, duty cycles of the PWM drive patterns corresponding to the power receivers 100A and 100B in step S3. One of the duty cycles is a standard duty cycle (100%), and the other of the duty cycles is an optimized duty cycle that is less than 100%. Details of step S3 will be described later below with reference to FIG. 13.

Next, the power transmitter 10 transmits the data representing the duty cycle to each of the power receivers 100A and 100B in step S4. Then, the power receiver 100A receives the duty cycle in step S4A and the power receiver 100B receives the duty cycle in step S4B.

Here, the controller 15 of the power transmitter 10 is set to transmit, to the power receivers 100A and 100B via the antenna 16, the data representing the duty cycle after calculating the duty cycle.

The controller 150A of the power receiver 100A sets the duty cycle for the PWM drive pattern in step S5A and the controller 150B of the power receiver 100B sets the duty cycle for the PWM drive pattern in step S5B.

The power transmitter 10 starts to transmit electric power in step S6. For example, the process of step S6 is executed when it is reported to the power transmitter 10 that the controller 150A and 150B complete the setting of the duty cycle to the PWM drive pattern.

Here, a method of obtaining the data representing the efficiencies of electric power reception of the power receivers 100A and 100B will be described with reference to FIG. 10 and FIG. 11.

Figure 10:
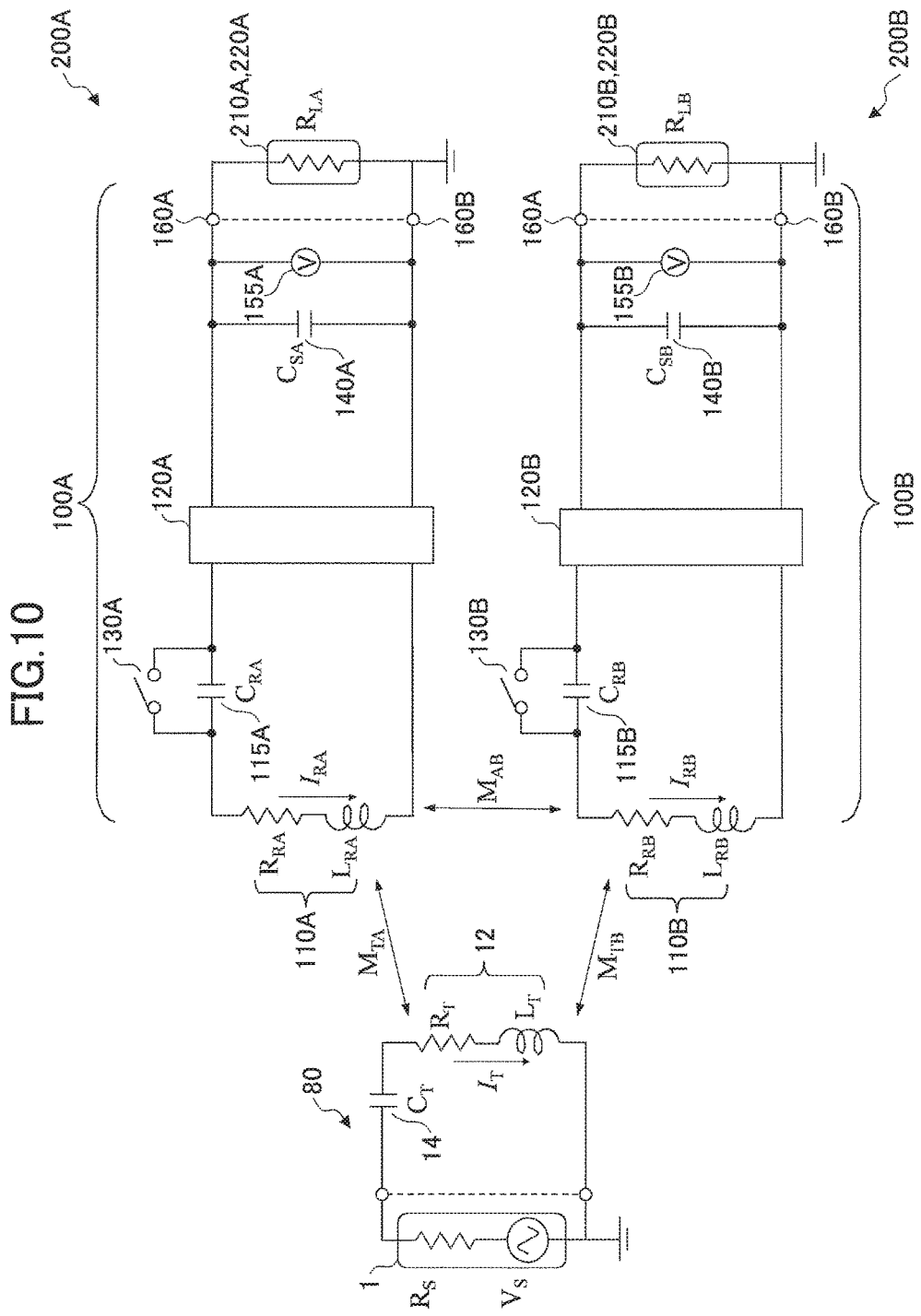
FIG. 10 is a diagram illustrating equivalent circuits of the power transmitting apparatus 80 and the electronic devices 200A and 200B.

FIG. 10 is a diagram illustrating equivalent circuits of the power transmitting apparatus 80 and the electronic devices 200A and 200B. The equivalent circuits illustrated in FIG. 10 correspond to the power transmitting apparatus 80 and the electronic devices 200A and 200B illustrated in FIG. 6. However, in the following description, the power transmitting apparatus 80 does not include a primary-side coil 11, and the primary-side resonant coil 12 is directly coupled to the AC power source 1. Further, the power receivers 100A and 100B respectively include the voltmeters 155A and 155B.

In FIG. 10, the secondary-side resonant coil 110A is a coil $L_{RA}$ and a resistor $R_{RA}$, and the capacitor 115A is a capacitor $C_{RA}$. Further, the smoothing capacitor 140A is a capacitor $C_{SA}$, and the DC-DC converter 210A and the battery 220A are a resistor $R_{LA}$.

Similarly, the secondary-side resonant coil 110B is a coil $L_{RB}$ and a resistor $R_{RB}$, and the capacitor 115B is a capacitor $C_{RB}$. Further, the smoothing capacitor 140B is a capacitor $C_{SB}$, and the DC-DC converter 210B and the battery 220B are a resistor $R_{LB}$.

Further, the resonant coil 12 of the power transmitting apparatus 80 is a resistor $R_T$ and a coil $L_T$, and the AC power source 1 is a power source $V_S$ and a resistor $R_S$. Further, the capacitor 14 is a capacitor $C_T$.

A mutual inductance between the power transmitting apparatus 80 and the electronic device 200A is $M_{TA}$, a mutual inductance between the power transmitting apparatus 80 and the electronic device 200B is $M_{TB}$, and a mutual inductance between the electronic device 200A and the electronic device 200B is $M_{AB}$.

Here, because the mutual inductance $M_{AB}$ is negligibly smaller in comparison with the mutual inductance $M_{TA}$ and the mutual inductance $M_{TB}$, the mutual inductance $M_{TA}$ and the mutual inductance $M_{TB}$ are discussed here.

The mutual inductance $M_{TA}$ is determined depending on the efficiency of electric power reception of the power receiver 100A of the electronic device 200A with the power transmitting apparatus 80. This is because the efficiency of electric power reception is determined depending on a position (distance) and an orientation (angle) of the power receiver 100A with respect to the power transmitting apparatus 80. Similarly, the mutual inductance $M_{TB}$ is determined depending on the efficiency of electric power reception of the power receiver 100B of the electronic device 200B with the power transmitting apparatus 80.

The efficiency of electric power reception of the power receiver 100A can be calculated by transmitting electric power from the power transmitter 10 to the power receiver 100A and measuring an amount of electric power received by the power receiver 100A in a state of turning off the power receiver 100B. Similarly, the efficiency of electric power reception of the power receiver 100B can be calculated by transmitting electric power from the power transmitter 10 to the power receiver 100B and measuring an amount of electric power received by the power receiver 100B in a state of turning off the power receiver 100A.

Accordingly, the mutual inductance $M_{TA}$ and the mutual inductance $M_{TB}$ can be obtained by obtaining the efficiency of electric power reception of the power receiver 100A alone and the efficiency of electric power reception of the power receiver 100B alone.

According to the first embodiment, the duty cycle of the PWM drive pattern that drives the switch 130A or the switch 130B is changed in order to change the proportions of the efficiencies of electric power reception of the secondary-side resonant coils 110A and 110B of the power receivers 100A and 100B.

Hence, table data is prepared in advance that associates duty cycles with relationships between mutual inductances $M_{TA}$ and mutual inductances $M_{TB}$. Then, the duty cycle of the PWM drive pattern is adjusted by using such table data.

FIGS. 11A and 11B are diagrams illustrating table data that associates duty cycles with relationships between mutual inductances $M_{TA}$ and mutual inductances $M_{TB}$.

FIG. 11A is table data for adjusting the duty cycle of the PWM drive pattern that drives the switch 130A in the state in which the duty cycle of the PWM drive pattern that drives the switch 130B is fixed to 100%.

Mutual inductances $M_{TA}1$, $M_{TA}2$, $M_{TA}3$, . . . have specific values of mutual inductance $M_{TA}$ in practice. Similarly, mutual inductances $M_{TB}1$, $M_{TB}2$, $M_{TB}3$, . . . have specific values of mutual inductance $M_{TB}$ in practice. Duty cycles duty 1A, duty 2A, duty 3A, . . . duty 11A, duty 12A, duty 13A, . . . have specific values of duty cycle experimentally obtained.

FIG. 11B is table data for adjusting the duty cycle of the PWM drive pattern that drives the switch 130B in the state in which the duty cycle of the PWM drive pattern that drives the switch 130A is fixed to 100%.

Mutual inductances $M_{TA}1, M_{TA}2, M_{TA}3, \ldots$ and mutual inductances $M_{TB}1, M_{TB}2, M_{TB}3, \ldots$ are similar to those of FIG. 11A. Duty cycles duty 1B, duty 2B, duty 3B, . . . duty 11B, duty 12B, duty 13B, . . . have specific values of duty cycle experimentally obtained.

The table data illustrated in FIGS. 11A and 11B can be created by trying to optimize the duty cycle with measuring the mutual inductances $M_{TA}$ and $M_{TB}$ while positions and orientations of the power receivers 100A and 100B with respect to the power transmitter 10 are variously changed.

FIGS. 12A and 12B are diagrams illustrating table data that associates efficiencies of electric power reception with mutual inductances $M_{TA}$ and $M_{TB}$. FIG. 12A is table data that associates respective mutual inductances $M_{TA}$ with efficiencies of electric power reception of the power receiver 100A. FIG. 12B is table data that associates respective mutual inductances $M_{TB}$ with efficiencies of electric power reception of the power receiver 100B.

The mutual inductances $M_{TA}$ and $M_{TB}$ are respectively determined depending on the efficiencies of electric power reception between the power transmitting apparatus 80 and the power receivers 100A and 100B.

In FIG. 12A, the mutual inductances $M_{TA}1, M_{TA}2, \ldots$ are associated with the efficiencies $E_A1, E_A2, \ldots$ of electric power reception of the power receiver 100A. Also, in FIG. 12B, the mutual inductances $M_{TB}1, M_{TB}2, \ldots$ are associated with the efficiencies $E_B1, E_B2, \ldots$ of electric power reception of the power receiver 100B.

By previously measuring the efficiencies of electric power reception and the mutual inductances $M_{TA}$ and $M_{TB}$ of the power receivers 100A and 100B through experiments or the like to create table data as illustrated in FIGS. 12A and 12B, the mutual inductances $M_{TA}$ and $M_{TB}$ of the power receivers 100A and 100B can be obtained from the efficiencies of electric power reception of the power receivers 100A and 100B. Alternatively, through a simulation, the mutual inductances $M_{TA}$ and $M_{TB}$ of the power receivers 100A and 100B can be obtained from the efficiencies of electric power reception of the power receivers 100A and 100B.

Next, a method of setting the duty cycle will be described with reference to FIG. 13.

Figure 13:
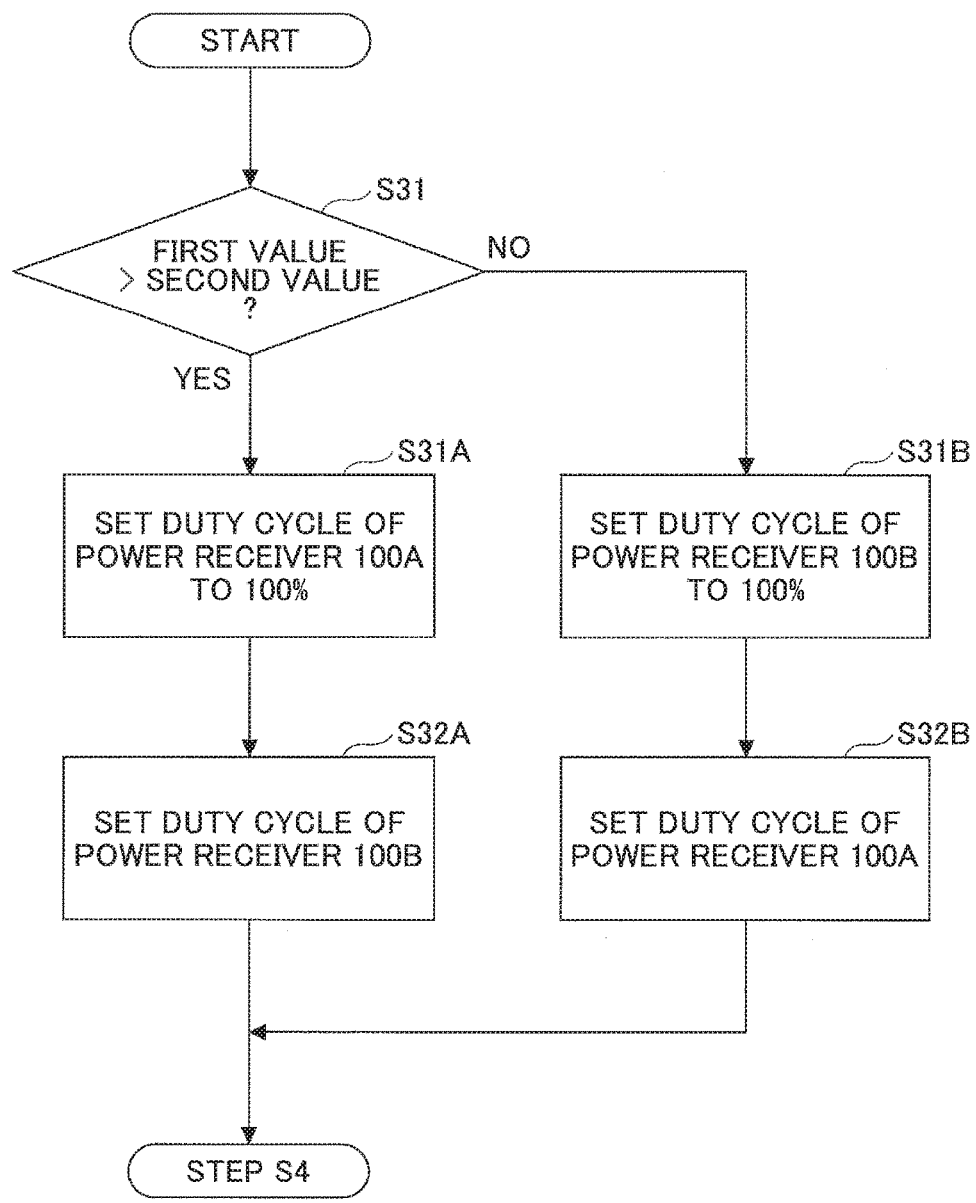
FIG. 13 is a flowchart illustrating a method in which the power transmitter 10 sets the duty cycle of the power receiver 100A or 100B according to the embodiment.

FIG. 13 is a flowchart illustrating a method by which the power transmitter 10 sets the duty cycle of the power receiver 100A or 100B according to the first embodiment. This flow illustrates processing that is executed by the controller 15 of the power transmitter 10 and illustrates details of the process of step S3 of FIG. 9.

The controller 15 starts processing illustrated in FIG. 13, upon proceeding to step S3 by receiving from the power receivers 100A and 100B the signals that represent the received electric power to obtain the efficiencies of electric power reception and receiving from the power receivers 100A and 100B the signals that represent the rated outputs.

The controller 15 calculates a first value, obtained by dividing the rated output of the battery 220A by the efficiency of electric power reception of the secondary-side resonant coil 110A and a second value, obtained by dividing the rated output of the battery 220B by the efficiency of electric power reception of the secondary-side resonant coil 110B, and determines whether the first value is greater than the second value in step S31.

Upon determining that the first value is greater than the second value (YES in step S31), the controller 15 sets the duty cycle of the PWM drive pattern that drives the switch 130A of the power receiver 100A to be 100% in step S31A.

Next, the controller 15 sets the duty cycle of the PWM drive pattern that drives the switch 130B of the power receiver 100B in step S32A. Specifically, based on the table data illustrated in FIGS. 12A and 12B, the controller 15 obtains the mutual inductances $M_{TA}$ and $M_{TB}$ of the power receivers 100A and 100B from the efficiencies $E_A$ and $E_B$ of electric power reception of the power receivers 100A and 100B respectively. Then, from the table data illustrated in FIG. 11B, the controller 15 obtains the duty cycle of the PWM drive pattern that drives the switch 130B of the power receiver 100B based on the mutual inductances $M_{TA}$ and $M_{TB}$ of the power receivers 100A and 100B.

When the process of step S32A is completed, the controller 15 causes the flow to proceed to step S4 (see FIG. 9).

Upon determining that the first value is less than the second value (NO in step S31), the controller 15 sets the duty cycle of the PWM drive pattern that drives the switch 130B of the power receiver 100B to be 100% in step S31B.

Next, the controller 15 sets the duty cycle of the PWM drive pattern that drives the switch 130A of the power receiver 100A in step S32B. Specifically, based on the table data illustrated in FIGS. 12A and 12B, the controller 15 obtains the mutual inductances $M_{TA}$ and $M_{TB}$ of the power receivers 100A and 100B from the efficiencies $E_A$ and $E_B$ of electric power reception of the power receivers 100A and 100B respectively. Then, from the table data illustrated in FIG. 11A, the controller 15 obtains the duty cycle of the PWM drive pattern that drives the switch 130A of the power receiver 100A based on the mutual inductances $M_{TA}$ and $M_{TB}$ of the power receivers 100A and 100B.

When the process of step S32B is completed, the controller 15 causes the flow to proceed to step S4 (see FIG. 9).

In this way, the controller 15 sets the duty cycles of the PWM drive patterns for driving the switches 130A and 130B of the power receivers 100A and 100B.

As described above, according to the first embodiment, the required amount of electric power transmitted to the power receiver 100A and the required amount of electric power transmitted to the power receiver 100B are obtained by the efficiencies of electric power reception of the secondary-side resonant coils 110A and 110B of the power receivers 100A and 100B and the rated outputs of the electronic devices 200A and 200B.

Then, the duty cycle of the PWM drive pattern corresponding to the power receiver (100A or 100B) of which the required amount of transmission electric power is smaller among the power receivers 100A and 100B is decreased.

As a result, by reducing the duty cycle of the PWM drive pattern corresponding to the power receiver (100A or 100B) of which the required amount of transmission electric power is smaller, the amount of electric power supplied to the power receiver (100A or 100B) of which the required amount of transmission electric power is smaller is reduced and it is possible to increase the amount of electric power supplied to the power receiver (100A or 100B) of which the required amount of transmission electric power is larger.

In this way, the balance between the amount of electric power supplied to the power receiver 100A and the amount of electric power supplied to the power receiver 100B is improved.

Thus, according to the first embodiment, it is possible to provide the power receiver 100A or 100B that can improve the balance of supplied amounts of electric power. Further, according to the first embodiment, it is possible to provide the power transmitting system 500 that can improve the balance of supply amounts of electric power.

Further, in the above description of the embodiment, the balance between the amount of electric power supplied to the power receiver 100A and the amount of electric power supplied to the power receiver 100 is improved by decreasing the duty cycle of the PWM drive pattern corresponding to the power receiver (100A or 100B) of which the required amount of transmission electric power is smaller among the power receivers 100A and 100B.

However, there may be a case where three or more power receivers are charged at the same time. In such a case, a duty cycle of a PWM drive pattern of a power receiver other than a power receiver of which the required amount of electric power is largest, among amounts of electric power obtained by dividing respective rated outputs by efficiencies of electric power reception, may be decreased.

Further, in the above description of the example of the embodiment, each of the electronic devices 200A and 200B is a terminal device such as a tablet computer or a smartphone. However, each of the electronic devices 200A and 200B may be any electronic device that includes a chargeable battery such as a node-type Personal Computer (PC), a portable phone terminal, a portable game machine, a digital camera, or a video camera, for example.

Further, in the above description of the embodiment, the power receivers 100A and 100B simultaneously charge the batteries 220A and 220B. However, the electronic devices 200A and 200B may operate to directly consume electric power, which the power receivers 100A and 100B receive, without including the batteries 220A and 220B. Even in the case where the electronic devices 200A and 200B do not include the batteries 220A and 220B, it is possible to drive the electronic devices 200A and 200B at the same time because the power receivers 100A and 100B can receive electric power simultaneously and effectively. This is one merit of the case of simultaneously receiving electric power because this is impossible in a case of receiving electric power in a time-division manner. In such a case, duty cycles may be set by using rated outputs necessary for driving the electronic devices 200A and 200B.

Second Embodiment

Figure 14:
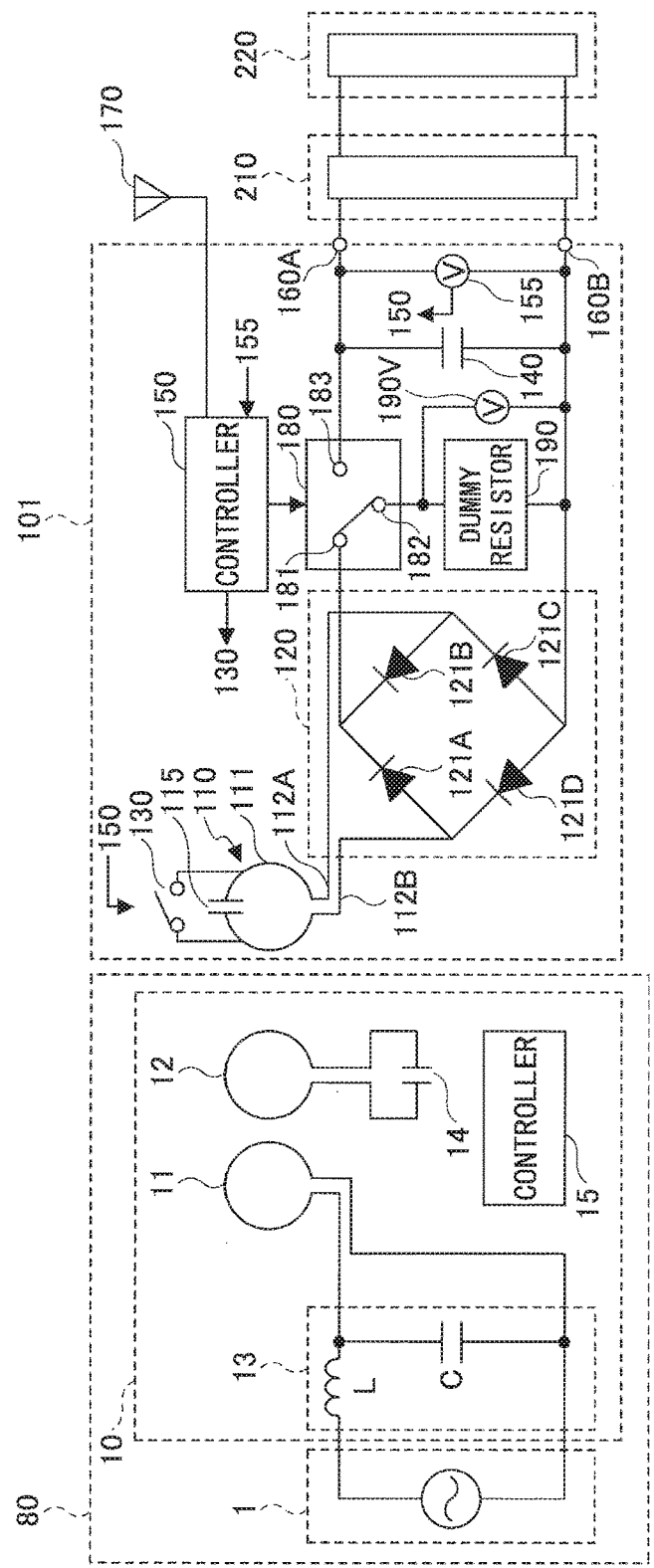
FIG. 14 is a diagram illustrating a power transmitting apparatus 80 and a power receiver 101 according to a second embodiment.

FIG. 14 is a diagram illustrating a power transmitting apparatus 80 and a power receiver 101 according to a second embodiment. The power transmitting apparatus 80 is equivalent to that illustrated in FIG. 4.

The power receiver 101 has a configuration in which a switch 180, a dummy resistor 190, and a voltmeter 190V are added to the power receiver 100 (refer to FIG. 4) of the first embodiment. Because other configurations are equivalent to those of the power receiver 100, the same numerals are given to the equivalent configuration elements and their descriptions are omitted.

The switch 180 is a switch that includes three terminals 181, 182, and 183. The terminals 181, 182, and 183 are respectively coupled to an output terminal on a high voltage side (upper side in FIG. 14) of the rectifier circuit 120, an upper side terminal of the dummy resistor 190, and an upper side terminal of the smoothing capacitor 140.

The switch 180 is driven by the controller 150 to switch a coupling destination of the terminal 181 to either the terminal 182 or the terminal 183. That is, the switch 180 switches the coupling destination of the output terminal on the high voltage side of the rectifier circuit 120 to either the upper side terminal of the dummy resistor 190 or the upper side terminal of the smoothing capacitor 140.

The dummy resistor 190 is coupled between the terminal 182 of the switch 180 and a low voltage side line, which couples a lower side terminal of the smoothing capacitor 140 and the output terminal 160B. The dummy resistor 190 is a resistor that has impedance equal to impedance of the battery 220. The voltmeter 190V is coupled in parallel to the dummy resistor 190.

The dummy resistor 190 is provided to be used instead of the battery 220 when an efficiency of electric power reception of the power receiver 101 is measured. This is because the efficiency of electric power reception can be measured through smaller electric power consumption by causing an electric current to flow through the dummy resistor 190 having the impedance (resistance value) equal to that of the battery 220 to measure the efficiency of electric power reception, than by measuring the efficiency of electric power reception through charging the battery 220.

Note that received electric power may be calculated, by the controller 150, based on a voltage V measured by the voltmeter 190V and a resistance value R of the dummy resistor 190. The received electric power P can be obtained by a formula of $P=V^2/R$.

Using the efficiency of electric power reception measured by using the dummy resistor 190, the power receiver 101 according to the second embodiment determines a duty cycle of the PWM drive pattern that drives the switch 130 of the power receiver 101.

Note that the switch 180 may be inserted, between the rectifier circuit 120 and the smoothing capacitor 140, on a lower voltage side line that couples the lower side terminal of the smoothing capacitor 140 and the output terminal 160B. In this case, the dummy resistor 190 may be coupled between the switch 180 and the higher voltage side line that couples the upper side terminal of the smoothing capacitor 140 and the output terminal 160A.

In the following, data that represents received electric power, a rated output, a duty cycle or the like is communicated between the controller 15 of the power transmitter 10 and the controllers 150A and 150B of the power receivers 101A and 101B. The communications between the controllers 150A and 150B and the controller 15 are performed between the antennas 170A and 170B and the antenna 16 (see FIG. 6).

Figure 15:
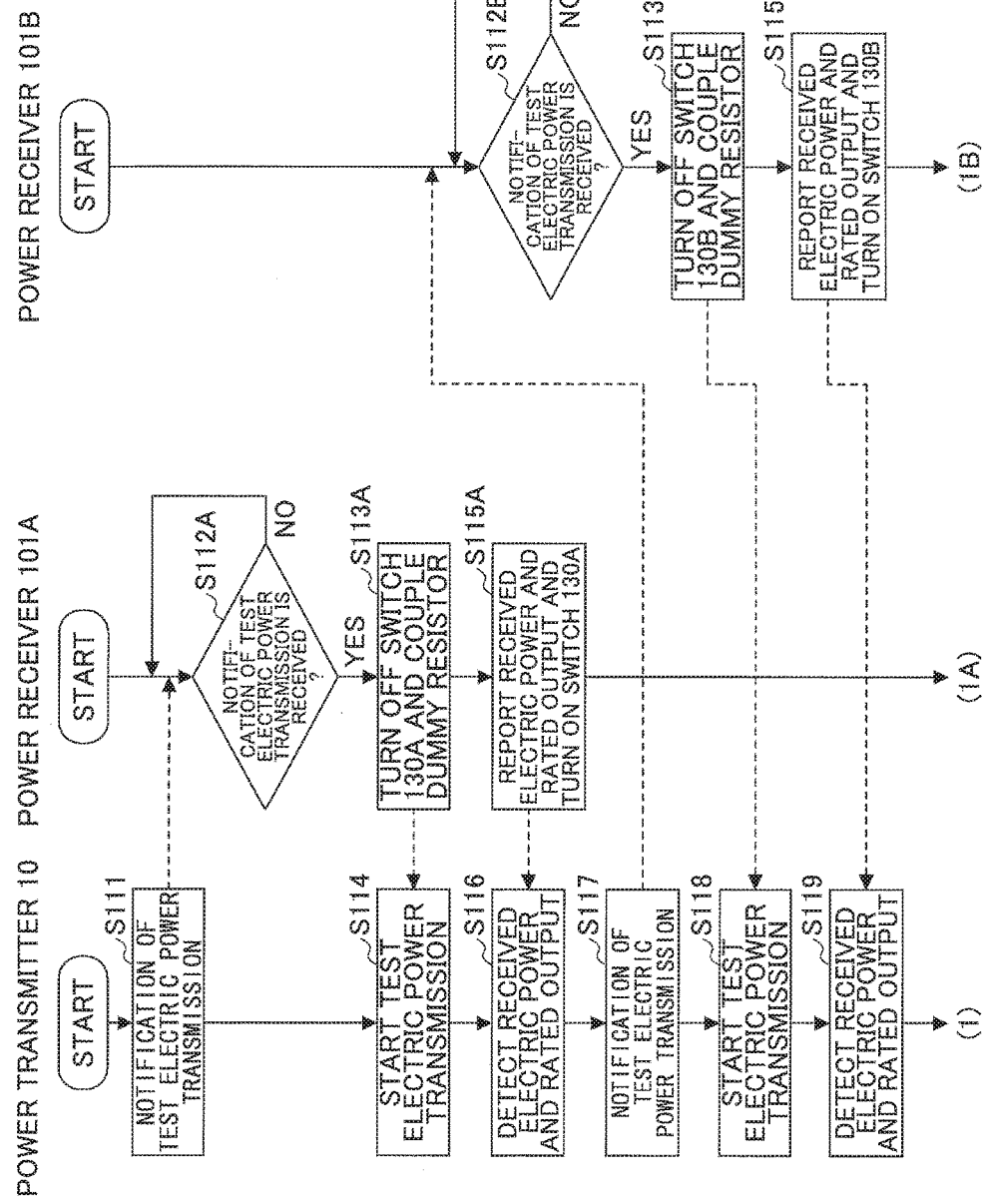
FIG. 15 is a task diagram illustrating processing that the power transmitter 10 and power receivers 101A and 101B according to the second embodiment execute for setting the duty cycles.
Figure 16:
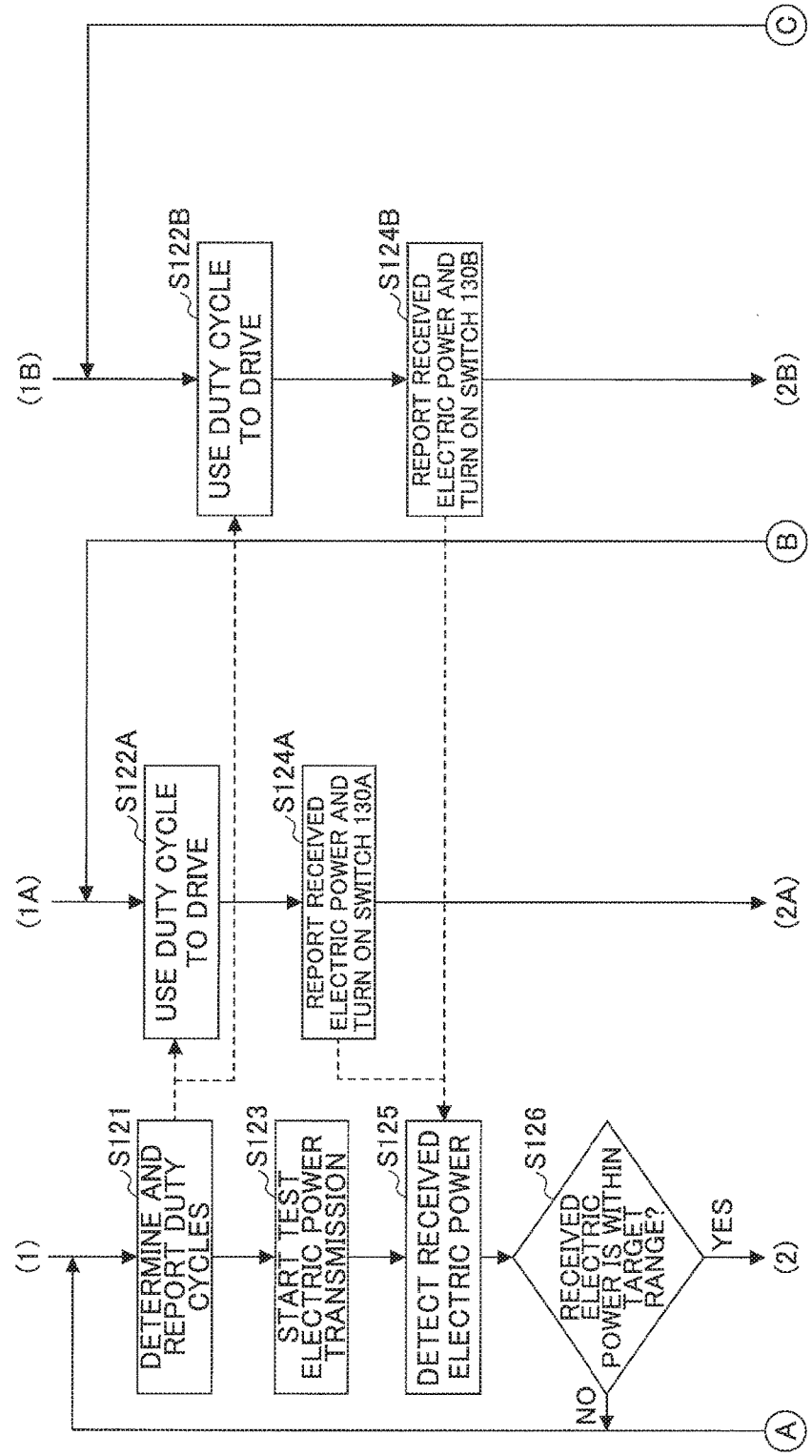
FIG. 16 is a task diagram illustrating processing that the power transmitter 10 and the power receivers 101A and 101B according to the second embodiment execute for setting the duty cycles.
Figure 17:
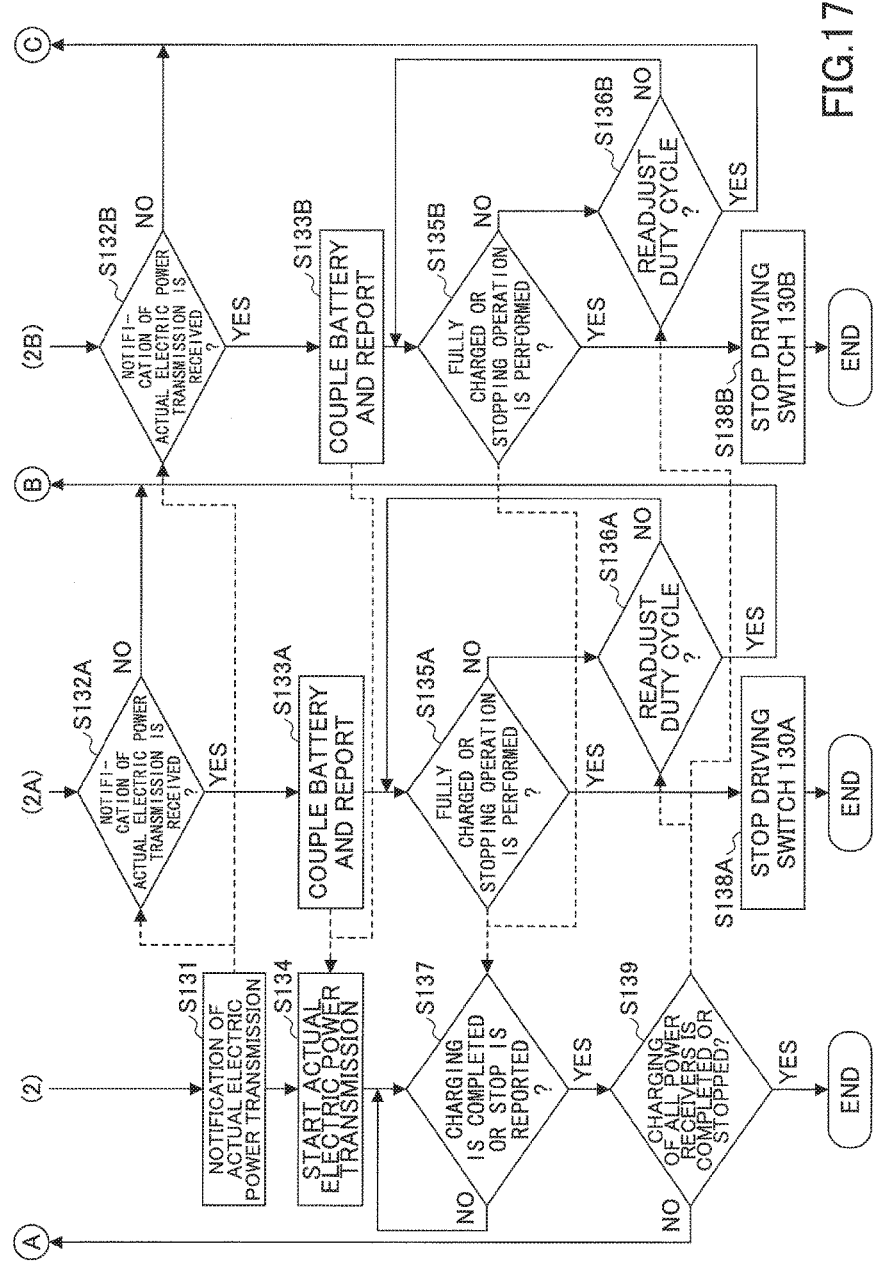
FIG. 17 is a task diagram illustrating processing that the power transmitter 10 and the power receivers 101A and 101B according to the second embodiment execute for setting the duty cycles.

FIG. 15 to FIG. 17 are task diagrams illustrating processing that the power transmitter 10 and power receivers 101A and 101B according to the second embodiment execute for setting the duty cycles.

Each of the power receivers 101A and 101B has a configuration equivalent to that of the power receiver 101 illustrated in FIG. 14. Further, similar to the power receivers 100A and 100B of the first embodiment illustrated in FIG. 6, each of the power receivers 101A and 101B receives electric power from one power transmitter 10. Here, they are referred to as the power receiver 101A and the power receiver 101B in order to distinguish the two power receivers 101.

It is assumed in the following description that the power receiver 101A includes a secondary-side resonant coil 110A, a capacitor 115A, a rectifier circuit 120A, a switch 130A, a smoothing capacitor 140A, a controller 150A, a switch 180A, and a dummy resistor 190A. A DC-DC converter 210A and a battery 220A are coupled to the power receiver 101A (see FIG. 6).

Similarly, it is assumed in the following description that the power receiver 101B includes a secondary-side resonant coil 110B, a capacitor 115B, a rectifier circuit 120B, a switch 130B, a smoothing capacitor 140B, a controller 150B, a switch 180B, and a dummy resistor 190B. A DC-DC converter 210B and a battery 220B are coupled to the power receiver 101B (see FIG. 6).

Although the processing illustrated in FIG. 15 to FIG. 17 are executed by the controller 15 of the power transmitter 10 (see FIG. 14) and the controllers 150 of the power receivers 101A and 101B (see FIG. 14), in the following description, the power transmitter 10 and the power receivers 101A and 101B are taken as performing the processing.

The power receivers 101A and 101B of the power transmitter 10 start preparation for electric power transmission (START). For example, the preparation for electric power transmission may be started by setting the power transmitter 10 and the power receivers 101A and 101B to a predetermined preparatory mode and by reporting a request from the power receivers 101A and 101B to the power transmitter 10 for electric power transmission.

Here, the switch 130A of the power receiver 101 and the switch 130B of the power receiver 101B are turned on (conductive) unless otherwise controlled specifically. When the switches 130A and 130B are on, it is a state (resonance off state) in which resonance through magnetic field resonance is not generated in the power receivers 101A and 101B.

First, the power transmitter 10 transmits, to the power receiver 101A in step S111, a notification of test electric power transmission. Here, it is assumed that the power receiver 101A reports an electric power transmission request to the power transmitter 10 before the power receiver 101B reports an electric power transmission request to the power transmitter 10. In step S111, the power transmitter 10 transmits, to the power receiver 101A that has reported the power transmission request earliest, the notification of test electric power transmission. Note that the power transmitter 10 identifies the power receiver 101A or 101B by using an identifier or the like for identifying the power receiver 101A or 101B.

The power receiver 101A determines in step S112A whether a notification of test electric power transmission is received from the power transmitter 10. Note that the power receiver 101A repeatedly executes the process of step S112A until receiving the notification of test electric power transmission from the power transmitter 10.

The power receiver 101A turns off the switch 130A with a duty cycle of 100% and switches the coupling destination of the switch 180A to the dummy resistor 190A in step 113A. "Off with the duty cycle of 100%" means a state in which the switch 130A is successively and completely off during one cycle of the PWM drive pattern. Further, the state in which the switch 130A is off is a state, in which resonance due to magnetic field resonance may be generated when the power receiver 101A receives electric power. Upon completing the process of step S113A, the power receiver 101A reports completion to the power transmitter 10.

The power transmitter 10 starts test electric power transmission in step S114. In this way, the power receiver 101A starts to receive the electric power.

The power receiver 101A reports, to the power transmitter 10, a rated output of the battery 220A and the received electric power that represents the electric power received from the power transmitter 10, and turns on the switch 130A in step S115A. When the switch 130A is turned on, the power receiver 101A enters a state in which resonance due to magnetic field resonance is not generated even if receiving electric power. That is, it enters a state in which resonance is off. The state, in which the switch 130A is turned on and the resonance is turned off, is a state that has no effect when the power receiver 101B measures an efficiency of electric power reception by receiving electric power from the power transmitter 10.

The power transmitter 10 receives data, which represents the received electric power and the rated output of the battery 220A, transmitted from the power receiver 101A, and detects the rated output and the received electric power of the power receiver 101A in step S116.

Next, the power transmitter 10 transmits, to the power receiver 101B in step S117, a notification of test electric power transmission.

The power receiver 101B determines in step S112B whether a notification of test electric power transmission is received from the power transmitter 10. Note that the power receiver 101B repeatedly executes the process of step S112B until receiving the notification of test electric power transmission from the power transmitter 10.

The power receiver 101B turns off the switch 130B with a duty cycle of 100% and switches the coupling destination of the switch 180B to the dummy resistor 190B in step 113B. "Off with the duty cycle of 100%" means a state in which the switch 130B is successively and completely off during one cycle of the PWM drive pattern. Further, the state in which the switch 130B is off is a state, in which resonance due to magnetic field resonance may be generated when the power receiver 101B receives electric power. Upon completing the process of step S113B, the power receiver 101B reports completion to the power transmitter 10.

The power transmitter 10 starts test electric power transmission in step S118. In this way, the power receiver 101B starts to receive the electric power.

The power receiver 101B reports, to the power transmitter 10, a rated output of the battery 220B and the received electric power that represents the electric power received from the power transmitter 10, and turns on the switch 130B in step S115B. When the switch 130B is turned on, the power receiver 101B enters a state in which resonance through magnetic field resonance is not generated even if receiving electric power. That is, it enters a state in which resonance is off.

The power transmitter 10 receives data, which represents the received electric power and the rated output of the battery 220B, transmitted from the power receiver 101B, and detects the rated output and the received electric power of the power receiver 101B in step S119.

The processing illustrated in FIG. 15 is completed as described above. Note that (1), (1A), and (1B) of the processing illustrated in FIG. 15 respectively lead to (1), (1A), and (1B) illustrated in FIG. 16.

Using the data, which represents the rated output of the battery 220A and the received electric power, received from the power receiver 101A and the data, which represents the rated output of the battery 220B and the received electric power, received from the power receiver 101B, the power transmitter 10 determines duty cycles of the PWM drive patterns that drive the switches 130A and 130B of the power receivers 101A and 101B and reports the duty cycles to the power receivers 101A and 101B in step S121. The duty cycles may be determined by a method similar to that of the first embodiment.

The power receiver 101A drives in step S122A the switch 130A by using the duty cycle received from the power transmitter 10. Similarly, the power receiver 101B drives in step S122B the switch 130B by using the duty cycle received from the power transmitter 10.

The power transmitter 10 starts test electric power transmission in step S123. Differing from the test electric power transmission in steps S114 and S118, this test electric power transmission is a test to simultaneously transmit electric power to both the power receiver 101A and the power receiver 101B. In a state of simultaneously receiving electric power, each of the power receivers 101A and 10B measures the received electric power.

The power receiver 101A reports, to the power transmitter 10, the received electric power that represents the electric power received from the power transmitter 10, and turns on the switch 130A in step S124A. Similarly, the power receiver 101B reports, to the power transmitter 10, the received electric power that represents the electric power received from the power transmitter 10, and turns on the switch 130B in step S124B.

The power transmitter 10 receives data, which represents the received electric power, transmitted from the power receiver 101A and data, which represents the received electric power, transmitted from the power receiver 101B, and thus detects the received electric power of the power receiver 101A and the received electric power of the power receiver 101B in step S125.

The power transmitter 10 determines whether the received electric power of the power receiver 101A and the received electric power of the power receiver 101B received in step S125 are within respective target ranges in step S126.

Here, for example, electric power of 50% of the rated output of the power receiver 101A and electric power of 50% of the rated output of the power receiver 101B are respectively set as lower limit values of the target ranges of received electric power, and electric power of 130% of the rated output of the power receiver 101A and electric power of 130% of the rated output of the power receiver 101B are respectively set as upper limits of the target ranges of received electric power.

Such target ranges of received electric power may be set, by the controller 15 of the power transmitter 10, based on the rated outputs of the batteries 220A and 220B received from the power receivers 101A and 101B in steps S116 and S119. Such target ranges of received electric power are used to enhance the balance of received electric power of the power receivers 101A and 101B.

Upon determining in step S126 that the proportion of the received electric power is not within the target range (NO in step S126), the power transmitter 10 causes the flow to return to step S121. This is in order to adjust the duty cycle(s) again to confirm whether the efficiency of electric power reception is within the target range. Note that when returning to step S121 to reset the duty cycles, among the power receivers 101A and 101B, the power transmitter 10 may increase the duty cycle of the power receiver of which the received electric power is less than or equal to the lower limit of the target range and decrease the duty cycle of the power receiver of which the received electric power is greater than or equal to the upper limit of the target range.

The processing illustrated in FIG. 16 is completed as described above. Note that (2), (2A), and (2B) of the processing illustrated in FIG. 16 respectively lead to (2), (2A), and (2B) illustrated in FIG. 17.

Upon determining that the received electric power is within the target range (YES in step S126), the power transmitter 10 transmits, to each of the power receivers 101A and 101B in step S131, a notification of actual electric power transmission that represents actual electric power transmission is to be performed. Differing from the test electric power transmission, the actual electric power transmission is to transmit electric power in order to actually charge the power receivers 101A and 101B. The notification of actual electric power transmission means a notification, which is reported from the power transmitter 10 to the power receivers 101A and 101B, that the actual electric power transmission is to be performed.

The power receiver 101A determines in step S132A whether a notification of actual electric power transmission is received from the power transmitter 10. Similarly, the power receiver 101B determines in step S132B whether a notification of actual electric power transmission is received from the power transmitter 10.

Note that in a case of not receiving the notification of actual electric power transmission, the respective power receivers 101A and 101B cause the flow to return to steps S122A and S122B. Because this corresponds to a case, in which it is determined by the power transmitter 10 that the received electric power is not within the target range in step S126, the power transmitter 10 returns to step S121 for transmitting to the power receivers 101A and 101B the duty cycles used to drive the switches 130A and 130B.

Upon determining that the notification of actual electric power transmission is received from the power transmitter 10 (YES in step S132A), the power receiver 101A switches the coupling destination of the switch 180A to the battery 220A, and reports to the power transmitter 10 that it is switched in step S133A. Similarly, upon determining that the notification of actual electric power transmission is received from the power transmitter 10 (YES in step S132B), the power receiver 101B switches the coupling destination of the switch 180B to the battery 220B, and reports to the power transmitter 10 that it is switched in step S133B.

The power transmitter 10 starts the actual electric power transmission in step S134.

The power receiver 101A determines in step S135A whether the battery 220A has become fully charged or whether an operation of stopping the charging has been performed by a user. Similarly, the power receiver 101B determines in step S135B whether the battery 220B has become fully charged or whether an operation of stopping the charging has been performed by a user.

Upon determining neither a full charge nor an operation of stopping the charging (NO in step S135A), the power receiver 101A determines in step S136A whether it is required to readjust the duty cycle.

For example, in a case where the power receiver 101B becomes fully charged or enters a state of not being charged due to the operation of stopping the charging, it is required to readjust the duty cycle of the power receiver 101A. Accordingly, the power receiver 101A determines that it is required to readjust the duty cycle, in a case where the power transmitter 10 determines in step S139 that will be described later below that the charging of the power receiver 101B is completed or the charging is stopped, and the power receiver 101A receives, from the power transmitter 10, a notification of the completion of the charging of the power receiver 101B or of the stopping of the charging.

Upon determining neither a full charge nor an operation of stopping the charging (NO in step S135B), the power receiver 101B determines in step S136B whether it is required to readjust the duty cycle.

For example, in a case where the power receiver 101A becomes fully charged or enters a state of not being charged due to the operation of stopping the charging, it is required to readjust the duty cycle of the power receiver 101B. Accordingly, the power receiver 101B determines that it is required to readjust the duty cycle, in a case where the power transmitter 10 determines in step S139 that will be described later below that the charging of the power receiver 101A is completed or the charging is stopped, and the power receiver 101B receives, from the power transmitter 10, a notification of the completion of the charging of the power receiver 101A or of the stopping of the charging.

Upon determining that the battery 220A is fully charged or the operation of stopping the charging is performed (YES in step S135A), the power receiver 101A reports, to the power transmitter 10, the charging completion or the occurrence of the stopping operation. In this way, the power receiver 101A completes the processing.

Similarly, upon determining that the battery 220B is fully charged or the operation of stopping the charging is performed (YES in step S135B), the power receiver 101B reports, to the power transmitter 10, the charging completion or the occurrence of the stopping operation. In this way, the power receiver 101B completes the processing.

The power transmitter 10 determines in step S137 whether the charging is completed or the stopping operation is performed in the power receiver 101A or 101B. The power transmitter 10 makes the determination of step S137 based on presence/absence of the notification, which represents the charging completion or the stopping operation, from the power receiver 101A or 101B. Note that the determination of step S137 is repeatedly executed until the notification, which represents the charging completion or the stopping operation, is received from the power receiver 101A or 101B.

Upon reporting to the power transmitter 10 that the battery 220A is fully charged or the operation of stopping the charging is performed, the power receiver 101A stops driving the switch 130A in step S138A. Similarly, upon reporting to the power transmitter 10 that the battery 220B is fully charged or the operation of stopping the charging is performed, the power receiver 101B stops driving the switch 130B in step S138B.

Upon determining that the notification, which represents the charging completion or the stopping operation, is received from the power receiver 101A or 101B (YES in step S137), the power transmitter 10 determines in step S139 whether the charging is completed or the charging is stopped for both of the power receivers 101A and 101B. This is because it is required to continue to transmit the electric power if the charging of one of the power receivers 101A and 101 is not completed or not stopped.

Upon determining that charging of one of the power receivers 101A and 101B is not completed or not stopped, (NO in step S139), the power transmitter 10 causes the flow to return to step S121. This is in order to again set the duty cycle(s) and to transmit the electric power.

Upon determining that the charging of the power receiver 101A is completed or the charging is stopped, the power transmitter 10 reports, to the power receiver 101B, that the charging of the power receiver 101A is completed or the charging is stopped. Similarly, upon determining that the charging of the power receiver 101B is completed or the charging is stopped, the power transmitter 10 reports, to the power receiver 101A, that the charging of the power receiver 101B is completed or the charging is stopped.

Upon determining that the charging is completed or the charging is stopped in both of the power receivers 101A and 101B (YES in step S139), the power transmitter 10 completes the processing.

As described above, the processing of transmitting the electric power to the power receivers 101A and 101B by the power transmitter 10 is completed.

Note that although it has been described in the above embodiment that the duty cycles are determined in the case where the two power receivers 101A and 101B receive the electric power from the power transmitter 10, duty cycles may be similarly determined in a case where three or more power receivers receive electric power from the power transmitter 10. For example, in a case where three power receivers are present, after completion of step S115B, steps equivalent to steps S111, S112A, S113A, S114, S115A, and S116 are performed for the third power receiver. Thereby, the power transmitter 10 may obtain a rated output and received electric power of the third power receiver.

Then, after the duty cycle of the third power receiver is determined and it is determined whether the received electric power is within the target range, actual electric power transmission may be performed. The above processes are similarly performed in a case where four or more power receivers are present.

As described above, according to the second embodiment, it is possible to provide the power receiver 101A or 101B that can improve the balance of supplied amounts of electric power. Further, according to the second embodiment, it is possible to provide the power transmitting system that can improve the balance of supply amounts of electric power.

Further, according to the second embodiment, the processes of test electric power transmission through steps S121 to S126 are performed when the duty cycles of the power receivers 101A and 101B are determined. Then, as a result of the test electric power transmission, when the received electric power of the power receivers 101A and 101B is not within the target range, the duty cycles are readjusted to obtain the duty cycles that can further improve the balance of electric power reception.

Therefore, according to the second embodiment, it is possible to provide the power receiver 101A or 101B that further improves the balance of supplied amounts of electric power.

Third Embodiment

Figure 18:
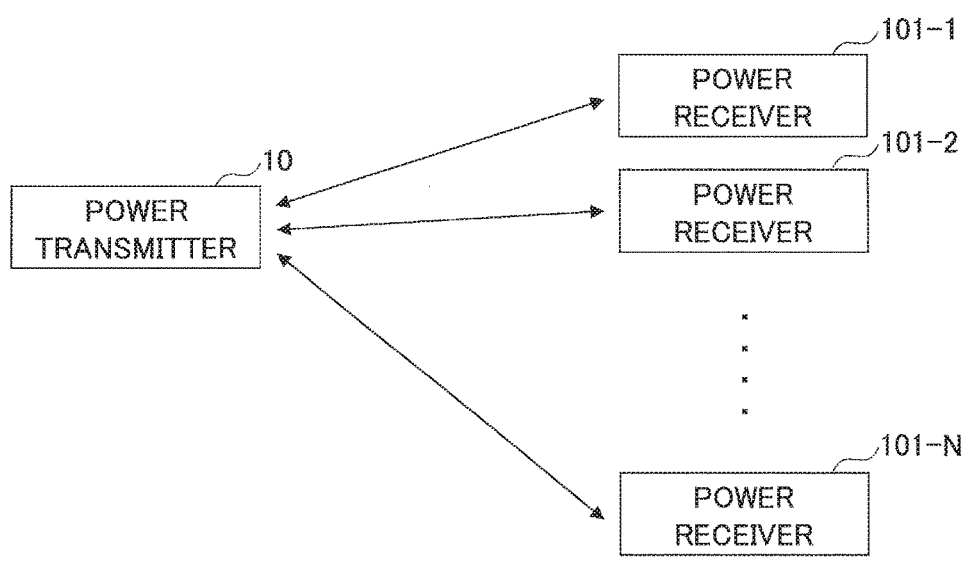
FIG. 18 is a diagram illustrating the power transmitter 10 and N power receivers 101-1, 101-2, . . . , and 101-N according to a third embodiment.
Figure 19:
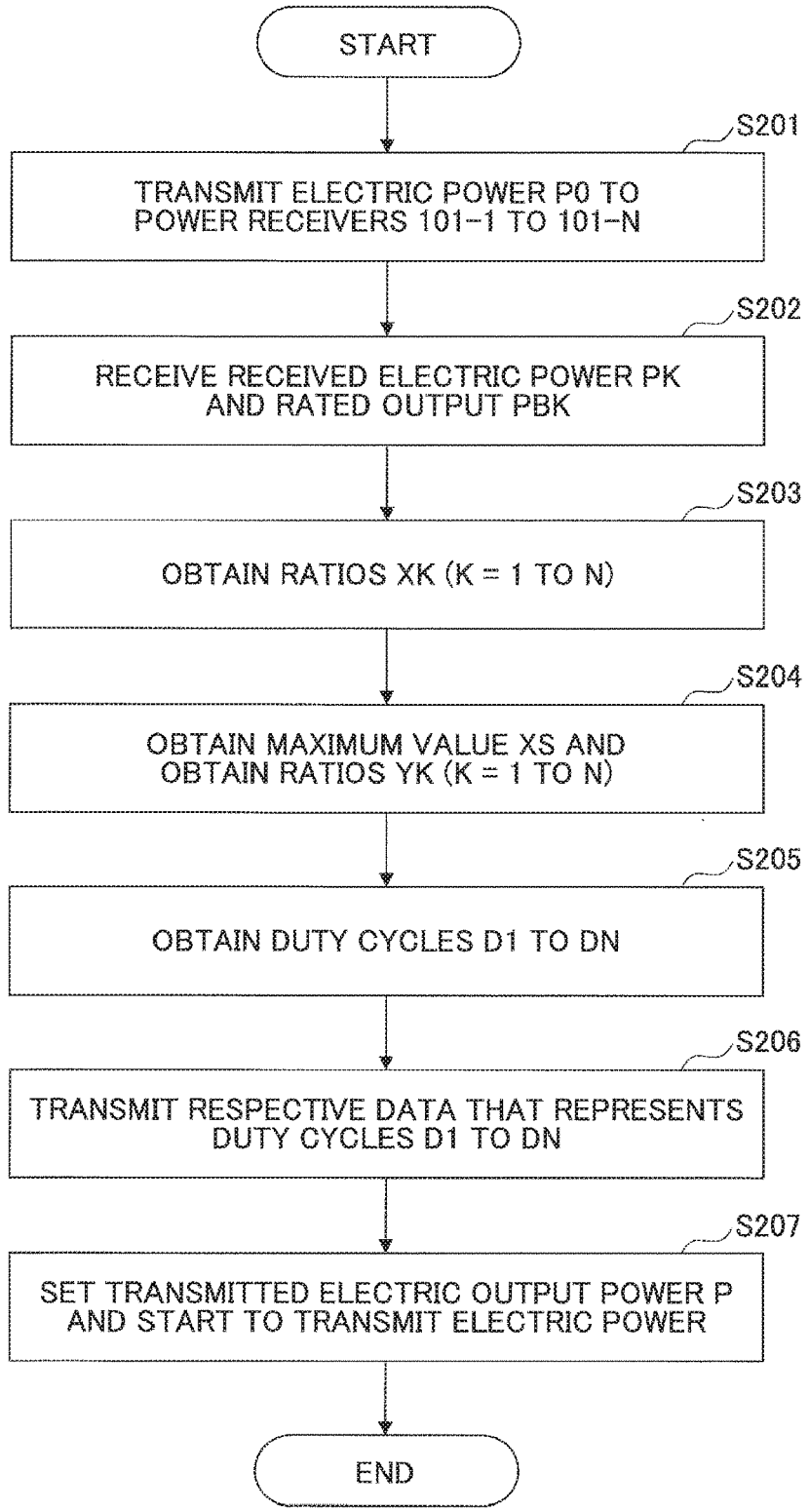
FIG. 19 is a flowchart illustrating processing of determining duty cycles and transmitted electric output power P according to the third embodiment.

FIG. 18 is a diagram illustrating the power transmitter 10 and N power receivers 101-1, 101-2, . . . , and 101-N according to a third embodiment. FIG. 19 is a flowchart illustrating processing of determining duty cycles and transmitted electric output power P according to the third embodiment. FIG. 20 is a diagram illustrating tabular data used in the third embodiment.

In the third embodiment, a method will be described of determining duty cycles of PWM drive patterns that drive the switches 130 of the power receivers 101-1 to 101-N when electric power is transmitted from one power transmitter to the N power receivers 101-1, 101-2, . . . , and 101-N.

Here, N is any integer number, and may be an integer number equal to or greater than 2.

Each of the power receivers 101-1 to 101-N has a configuration equivalent to that of the power receivers 101A and 101B of the second embodiment. Further, it is assumed in the following description that DC-DC converters 210B and batteries 220B are coupled to the respective power receivers 101-1 to 101-N.

In the following, data that represents received electric power, a duty cycle or the like is communicated between the controller 15 of the power transmitter 10 and the controllers 150 of the power receivers 101-1 to 101-N. The communications between the controllers 150 and the controller 15 are performed between the antennas 170 the antenna 16 (see FIG. 6).

Specifically, according to the third embodiment, duty cycles of PWM drive patterns that drive the switches 130 included in the respective power receivers 101-1 to 101-N are determined in a procedure as follows.

First, the power transmitter 10 individually transmits, to each of the power receivers 101-1 to 101-N, electric power P0 in step S201. Upon receiving the electric power P0, each of the power receivers 101-1 to 101-N transmits, to the power transmitter 10, data, which represents a rated output PBK (K=1 to N) of the battery 220 and received electric power PK (K=1 to N).

Next, the power transmitter 10 receives the data that represents the rated output PBK (K=1 to N) of the battery 220 and the received electric power PK (K=1 to N) in step S202.

The received electric power PK is measured, inside of each of the power receivers 101-1 to 101-N, by coupling the switch 180 to the dummy resistor 190. The rated outputs PBK are the rated outputs of the batteries 220 coupled to the respective power receivers 101-1 to 101-N. Each of the controllers 150 of the power receivers 101-1 to 101-N stores the data that represents the rated output of the battery 220 in an internal memory.

The power transmitter 10 transmits the electric power N times because the power transmitter 10 transmits the electric power to each of the power receivers 101-1 to 101-N on a one-to-one basis. Note that the electric power P0, which the power transmitter 10 transmits to each of the power receivers 101-1 to 101-N, is equal with respect to each of the power receivers 101-1 to 101-N.

Next, the power transmitter 10 calculates, with respect to each of the power receivers 101-1 to 101-N, a ratio XK (K=1 to N) of the rated output PBK (K=1 to N) with respect to the received electric power (K=1 to N) in step S203. Here, the ratio XK is obtained by a formula of XK=PBK/PK.

Next, the power transmitter 10 obtains the maximum value XS among the ratios XK, and calculates, with respect to the respective power receivers 101-1 to 101-N, ratios YK (K=1 to N) of the ratios XK with respect to the maximum value XS in step S204. Here, the ratio YK is obtained by a formula of YK=XK/XS.

Next, the power transmitter 10 obtains duty cycles D1 to DN that enable the respective received electric power of the power receivers 101-1 to 101-N to be Y1 to YN-fold in step S205. For example, tabular data as illustrated in FIG. 20 may be used to obtain the duty cycles D1 to DN that enable respective received electric power to be Y1 to YN-fold.

The tabular data illustrated in FIG. 20 is data that associates combinations of the ratios Y1 to YN with combinations of the duty cycles D1 to DN. There are Ya1, Ya2, . . . , and YaN, Yb1, Yb2, . . . , and YbN, and the like for the combinations of the ratios Y1 to YN. There are Da1, Da2, . . . , and DaN, Db1, Db2, . . . , and DbN, and the like for the combinations of values of the duty cycles D1 to DN.

The combination Ya1, Ya2, . . . of the ratios Y1 to YN is respectively associated with the combination Da1, Da2, . . . , and DaN of the duty cycles D1 to DN. The combination Yb1, Yb2, . . . of the ratios Y1 to YN is respectively associated with the combination Db1, Db2, . . . , and DbN of the duty cycles D1 to DN.

Numerous data, which associate such combinations of the ratios Y1 to YN with such combinations of the duty cycles D1 to DN, may be prepared, and the duty cycles D1 to DN, which correspond to the ratios Y1 to YN obtained for the power receivers 101-1 to 101-N in step S204, may be obtained from the tabular data illustrated in FIG. 20.

Note that in a case where the combination of the ratios Y1 to YN obtained for the power receivers 101-1 to 101-N in step S204 is not included in the tabular data illustrated in FIG. 20, duty cycles D1 to DN, associated with ratios Y1 to YN close to the ratios Y1 to YN obtained in step S204, may be used. In the case where the combination of the ratios Y1 to YN obtained in step S204 is not included in the tabular data illustrated in FIG. 20, duty cycles D1 to DN, obtained through interpolating processing or the like for obtaining ratios Y1 to YN close to the ratios Y1 to YN of the combination obtained in step S204, may be used.

Here, the embodiment has been described in which the duty cycles D1 to DN are obtained by using the tabular data illustrated in FIG. 20. However, the duty cycles D1 to DN may be calculated in accordance with the values of the ratios Y1 to YN, for example. The values of the ratios Y1 to YN are 1 in a case where the ratio XK is the maximum value XS, and are values less than 1 in other cases. Thus, a required amount of received electric power increases as the values of the ratios Y1 to YN increase. Therefore, the duty cycles D1 to DN may be set to be larger as the values of the ratios Y1 to YN increase, and the duty cycles D1 to DN may be set to be smaller as the values of the ratios Y1 to YN decrease.

Next, the power transmitter 10 transmits the respective data that represent the duty cycles D1 to DN to the power receivers 101-1 to 101-N in step S206.

Finally, the power transmitter 10 sets transmitted electric output power P by the following formula in step S207.

$$P = \sum_{k=1}^{N} XK \times PK \qquad \text{(Formula 1)}$$

As described above, setting the duty cycles D1 to DN and transmitted electric output power P is thus completed.

As described above, according to the third embodiment, it is possible to provide the power receivers 101-1 to 101-N that can improve the balance of supplied amounts of electric power. Further, according to the third embodiment, it is possible to provide the power transmitting system (the power receivers 101-1 to 101-N and the power transmitter 10) that can improve the balance of supply amounts of electric power.

Fourth Embodiment

Figure 21:
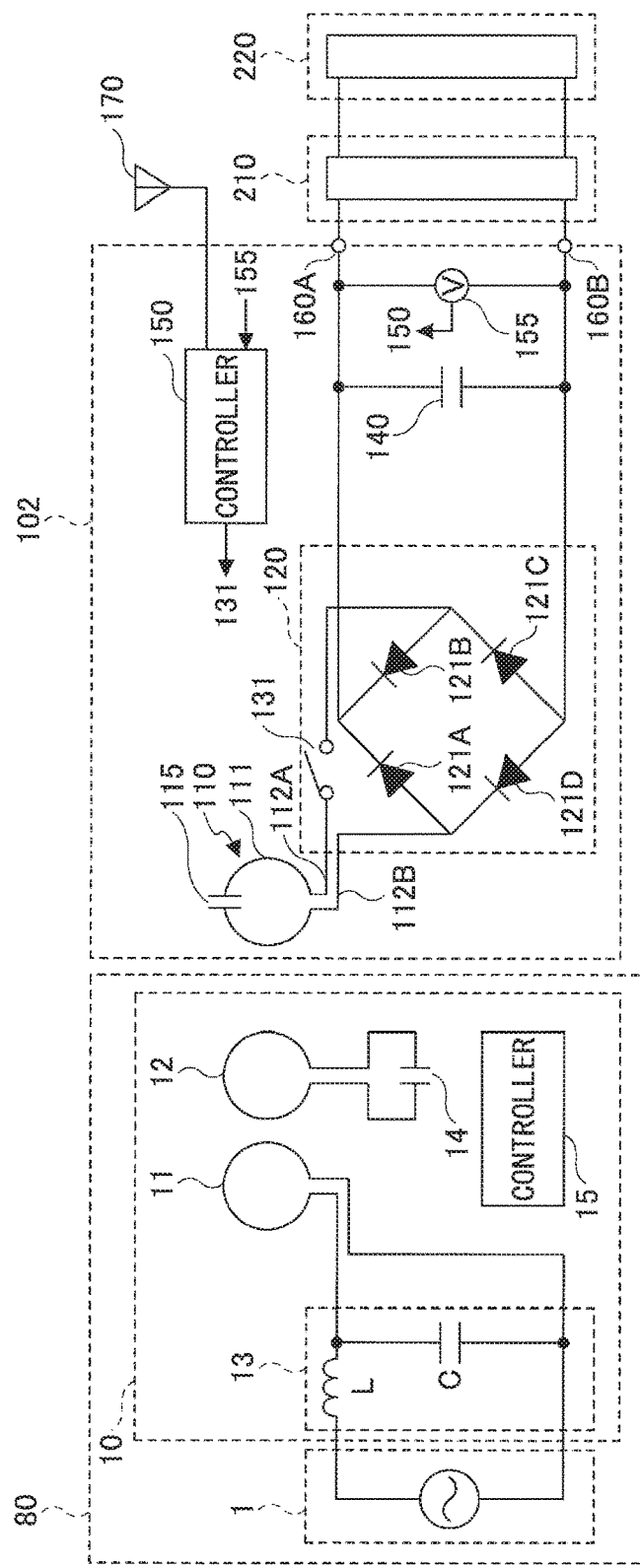
FIG. 21 is a diagram illustrating the power transmitting apparatus 80 and a power receiver 102 according to a fourth embodiment.

FIG. 21 is a diagram illustrating the power transmitting apparatus 80 and a power receiver 102 according to a fourth embodiment.

In the power receiver 102, a position of the switch 130 is changed from that of the power receiver 100 of the first embodiment (see FIG. 4). The power receiver 102 includes a switch 131 instead of the switch 130. The switch 131 is inserted between the rectifier circuit 120 and the terminal 112A of the secondary-side resonant coil 110. Similar to the switch 130 of the first embodiment, the switch 131 is driven by the controller 150 through PWM.

The switch 131 may be a switch that can perform cutoff of an alternating current at high speed. For example, a TRIAC, a switch combining a plurality of Field Effect Transistor (FETs), or the like may be used as the switch 131.

Similar to a case of driving and controlling the switch 130 of the power receiver 100 (see FIG. 4) of the first embodiment through the PWM drive pattern, an amount of electric power received at the secondary-side resonant coil 110 can be adjusted by driving and controlling on/off the switch 131 inserted between the rectifier circuit 120 and the terminal 112A of the secondary-side resonant coil 110 through the PWM drive pattern.

Therefore, according to the fourth embodiment, similar to the first embodiment, it is possible to provide the power receiver 102 that can improve the balance of supplied amounts of electric power.

Although examples of the power receivers and the power transmitting systems according to the embodiments of the present invention have been described above, the present invention is not limited to the embodiments specifically disclosed and various variations and modifications may be made without departing from the scope of the present invention.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. A power receiver comprising:
    a first secondary-side resonant coil, including a resonant coil part, a first terminal and a second terminal, that receives electric power from a primary-side resonant coil through magnetic field resonance generated between the primary-side resonant coil and the first secondary-side resonant coil, the first terminal and the second terminal being respectively provided on both ends of the resonant coil part;
    a capacitor inserted in series with the resonant coil part of the first secondary-side resonant coil;
    a rectifier circuit, coupled to the first terminal and the second terminal, that rectifies alternating-current power input from the first secondary-side resonant coil;
    a smoothing circuit coupled to an output side of the rectifier circuit;
    a pair of output terminals coupled to an output side of the smoothing circuit;
    a switch coupled in parallel to the capacitor or coupled in series between the rectifier circuit and one of the first terminal and the second terminal of the first secondary-side resonant coil; and
    a drive controller that drives the switch through a first PWM drive pattern determined by a first duty cycle and by a first frequency that is less than or equal to a frequency of the magnetic field resonance, the first duty cycle being set based on a first efficiency of electric power reception of the first secondary-side resonant coil, a first rated output of a first load coupled to the pair of output terminals, a second efficiency of electric power reception of a second secondary-side resonant coil of another power receiver that receives electric power from the primary-side resonant coil through magnetic field resonance generated between the primary-side resonant coil and the second secondary-side resonant coil, and a second rated output of a second load to which the electric power is supplied from the other power receiver.

2. The power receiver according to claim 1,
    wherein, when a first value obtained by dividing the first rated output by the first efficiency of electric power reception is less than a second value obtained by dividing the second rated output by the second efficiency of electric power reception, the first duty cycle is set to be a predetermined duty cycle that is less than a first initial value, and
    wherein the predetermined duty cycle is a duty cycle by which a balance between the electric power that the first load receives and the electric power that the second load receives is improved relative to a balance of a case where the first duty cycle is the first initial value.

3. The power receiver according to claim 2,
    wherein, when the first value obtained by dividing the first rated output by the first efficiency of electric power reception is greater than the second value obtained by dividing the second rated output by the second efficiency of electric power reception, the first duty cycle is set to be the first initial value.

4. The power receiver according to claim 3,
    wherein the first initial value is 100%.

5. The power receiver according to claim 1,
    wherein the first efficiency of electric power reception is obtained based on electric power that the primary-side resonant coil transmits and on electric power that the first secondary-side resonant coil receives from the primary-side resonant coil in a state in which the other power receiver is in a non-operating state, and
    wherein the second efficiency of electric power reception is obtained based on electric power that the primary-side resonant coil transmits and on electric power that the second secondary-side resonant coil receives from the primary-side resonant coil in a state in which the power receiver is in a non-operating state.

6. The power receiver according to claim 5, further comprising:
    a dummy load coupled to the pair of output terminals in parallel with the first load, the dummy load having an impedance property equal to an impedance property of the first load; and
    a selection switch that selectively switches a coupling destination of the pair of output terminals between the first load and the dummy load,
    wherein the first efficiency of electric power reception is obtained based on the electric power that the primary-side resonant coil transmits and on the electric power that the first secondary-side resonant coil receives from the primary-side resonant coil in a state in which the pair of output terminals and the dummy load are coupled to the selection switch, in the state in which the other power receiver is in the non-operating state.

7. A power transmitting system comprising:
    a first power receiver;
    a second power receiver; and
    a power transmitter including a primary-side resonant coil, wherein the first power receiver includes
a first secondary-side resonant coil, including a resonant coil part, a first terminal and a second terminal, that receives electric power from the primary-side resonant coil through magnetic field resonance generated between the primary-side resonant coil and the first secondary-side resonant coil, the first terminal and the second terminal being respectively provided on both ends of the resonant coil part;
a capacitor inserted in series with the resonant coil part of the first secondary-side resonant coil;
a rectifier circuit, coupled to the first terminal and the second terminal, that rectifies alternating-current power input from the first secondary-side resonant coil;
a smoothing circuit coupled to an output side of the rectifier circuit;
a pair of output terminals coupled to an output side of the smoothing circuit;
a switch coupled in parallel to the capacitor or coupled in series between the rectifier circuit and one of the first terminal and the second terminal of the first secondary-side resonant coil; and
a drive controller that drives the switch through a first PWM drive pattern determined by a first duty cycle and by a first frequency that is less than or equal to a frequency of the magnetic field resonance, the first duty cycle being set based on a first efficiency of electric power reception of the first secondary-side resonant coil, a first rated output of a first load coupled to the pair of output terminals, a second efficiency of electric power reception of a second secondary-side resonant coil of the second power receiver that receives electric power from the primary-side resonant coil through magnetic field resonance generated between the primary-side resonant coil and the second secondary-side resonant coil, and a second rated output of a second load to which the electric power is supplied from the second power receiver.

8. The power transmitting system according to claim 7, wherein the first power receiver and the second power receiver have a same circuit configuration.

9. The power transmitting system according to claim 8, wherein in the second power receiver, a switch is driven through a second PWM drive pattern determined by a second duty cycle and by a second frequency that is less than or equal to a frequency of the magnetic field resonance, the second duty cycle being set based on the second efficiency of electric power reception, the second rated output, the first efficiency of electric power reception, and the first rated output, wherein, when a second value obtained by dividing the second rated output by the second efficiency of electric power reception is less than a first value obtained by dividing the first rated output by the first efficiency of electric power reception, the second duty cycle is set to be a predetermined duty cycle that is less than a second initial value, and
wherein the predetermined duty cycle is a duty cycle by which a balance between the electric power that the first load receives and the electric power that the second load receives is improved relative to a balance of a case where the second duty cycle is the second initial value.

10. The power transmitting system according to claim 9, wherein, when the second value obtained by dividing the second rated output by the second efficiency of electric power reception is greater than the first value obtained by dividing the first rated output by the first efficiency of electric power reception, the second duty cycle is set to be the second initial value.

11. The power transmitting system according to claim 10, wherein the second initial value is 100%.

12. The power transmitting system according to claim 9, wherein, the first power receiver, the second power receiver, and the power transmitter respectively include a first communication part, a second communication part, and a third communication part,
wherein the third communication part of the power transmitter receives from the first communication part of the first power receiver first data that represents the first efficiency of electric power reception and the first rated output and receives from the second communication part of the second power receiver second data that represents the second efficiency of electric power reception and the second rated output,
wherein the power transmitter calculates the first value based on the first efficiency of electric power reception and the first rated output represented by the first data that the third communication part receives and calculates the second value based on the second efficiency of electric power reception and the second rated output represented by the second data that the third communication part receives, and
wherein the third communication part of the power transmitter transmits to the first communication part of the first power receiver data that represents the first value and transmits to the second communication part of the second power receiver data that represents the second value.

* * * * *